US00RE37752E

(19) United States
(12) Reissued Patent
Wolff

(10) Patent Number: US RE37,752 E
(45) Date of Reissued Patent: Jun. 18, 2002

(54) POLARIZATION VIEWER

(75) Inventor: Lawrence B. Wolff, Baltimore, MD (US)

(73) Assignee: Equinox Corporation, New York, NY (US)

(21) Appl. No.: 09/010,838

(22) Filed: Jan. 22, 1998

Related U.S. Patent Documents

Reissue of:
(64) Patent No.: 5,557,324
Issued: Sep. 17, 1996
Appl. No.: 07/968,175
Filed: Oct. 29, 1992

(51) Int. Cl.[7] ..... H04N 5/225
(52) U.S. Cl. ..... 348/207; 348/335
(58) Field of Search ..... 348/336, 337, 348/338, 207, 54, 57, 58, 49, 46, 335, 340; 359/247, 495, 63, 85

(56) References Cited

U.S. PATENT DOCUMENTS

| | | | |
|---|---|---|---|
| 2,647,440 | A | 3/1953 | Rehorn |
| 3,016,789 | A | 1/1962 | Keston |
| 3,230,820 | A | 1/1966 | Wisnieff |
| 3,371,324 | A | 2/1968 | Sinoto |
| 3,391,599 | A | 7/1968 | Fleisher et al. |
| 3,445,826 | A | 5/1969 | Myers |
| 3,445,833 | A | 5/1969 | Lins |
| 3,658,616 | A | 4/1972 | Dreyer |
| 3,992,571 | A | 11/1976 | Garlick et al. |
| 4,068,261 | A | 1/1978 | Yoshizaki |
| 4,335,939 | A | 6/1982 | Stovell et al. |
| 4,367,924 | A | 1/1983 | Clarle et al. |
| 4,375,317 | A | 3/1983 | Funada et al. |
| 4,423,927 | A | 1/1984 | Bly |
| 5,214,503 | A | 5/1993 | Chiu et al. |
| 5,264,916 | A | 11/1993 | Bushman |
| 5,327,285 | A | 7/1994 | Faris |
| 5,345,308 | A | 9/1994 | Bushman |
| 5,396,329 | A | 3/1995 | Kalawsky |
| 5,543,866 | A | 8/1996 | Van de Velde |

FOREIGN PATENT DOCUMENTS

| | | |
|---|---|---|
| DE | 3435369 | 5/1985 |
| JP | 3-78378 | 4/1991 |

*Primary Examiner*—Tuan Ho
(74) *Attorney, Agent, or Firm*—Jones, Tullar & Cooper, P.C.

(57) ABSTRACT

A polarization viewer comprising a mechanism for forming a broadview image having a spectral width greater than 2 angstroms and 0.50° based on polarization information of a scene. The polarization viewer is also comprised of a mechanism for providing polarization information to the forming mechanism. The providing mechanism is in communication with the forming mechanism. In a first embodiment, the providing mechanism includes a camera mechanism in communication with the forming mechanism. The camera mechanism includes a fixed polarizer analyzer disposed such that electromagnetic radiation entering the camera mechanism passes through the polarizer analyzer. The providing mechanism can also include a mechanism for steering a polarization plane of the radiation. The steering mechanism is disposed such that radiation passing through the polarizer analyzer first passes through the steering mechanism. The steering mechanism preferably includes a first twist crystal and at least a second twist crystal aligned with the first twist crystal such that radiation passing through the first crystal then passes through the second crystal. Each crystal has a first state and a second state. The first state does not effect the polarization plane of the radiation as the radiation passes through the crystal. The second state rotates the polarization plane of the radiation as the radiation passes through the crystal.

41 Claims, 12 Drawing Sheets

POLARIZATION VIEWER

Matter enclosed in heavy brackets [ ] appears in the original patent but forms no part of this reissue specification; matter printed in italics indicates the additions made by reissue.

FIELD OF THE INVENTION

The present invention is related to polarization viewers. More specifically, the present invention is related to a polarization viewer that preferably forms a transmitted radiance sinusoid in order to form an image based on polarization information concerning a scene.

BACKGROUND OF THE INVENTION

In the context of physics-based vision there is in fact a compelling motivation to study polarization vision-polarization affords a more general description of light than does intensity, and can therefore provide a richer set of descriptive physical constraints for the interpretation of an imaged scene. As intensity is the linear sum of polarization components, intensity images physically represent reduced polarization information. Because the study of polarization vision is more general than intensity vision, there are polarization cues that can immensely simplify some important visual tasks (e.g., region and edge segmentation, material classification, etc. . . ) which are more complicated or possibly infeasible when limited to using intensity and color information. A detailed description of a variety of polarization-based vision methods are contained in L. B. Wolff. Surface orientation from polarization images. In Proceedings of Optics, Illumination and Image Sensing for Machine Vision II, Volume 850, pages 110–121, Cambridge, Mass., November 1987. SPIE; L. B. Wolff. Polarization-based material classification from specular reflection. IEEE Transactions on Pattern Analysis and Machine Intelligence (PAMI), 12(11):1059–1071, November 1990; L. B. Wolff and T. E. Boult. Constraining object features using a polarization reflectance model. IEEE Transactions on Pattern Analysis and Machine Intelligence (PAMI), 13(7):635–657, July 1991; L. B. Wolff. Polarization Methods in Computer Vision. PhD thesis, Columbia University, January 1991; T. E. Boult and L. B. Wolff. Physically-based edge labeling. In Proceedings of IEEE Conference on Computer Vision and Pattern Recognition (CVPR), Maui, June 1991.

A criticism that has sometimes been leveled at polarization-based vision methods is the inconvenience of obtaining polarization component images by having to place a linear polarizing filter in front of an intensity CCD camera and mechanically rotating this filter by hand or by motor into different orientations. This inconvenience is a result of commercially available camera sensors being geared towards taking intensity images instead of polarization images. There are considerable advantages to building a camera sensor geared towards doing polarization vision, capable of taking polarization images without external mechanical manipulation of a filter. There already exist polarization-based vision methods that can significantly benefit a number of application areas such as aerial reconnaissance, autonomous navigation, inspection, and, manufacturing and quality control. A polarization camera would make polarization-based vision methods more accessible to these application areas and others. It should be fully realized that as intensity is a compression of polarization component information, a polarization camera can function as a conventional intensity camera, so that intensity vision methods can be implemented by such a camera either alone, or, together with polarization-based vision methods. As intensity-based methods are physical instances of polarization-based methods, a camera sensor geared towards polarization-vision does not in any way exclude intensity vision, it only generalizes it providing more physical input to an automated vision system. Adding color sensing capability to a polarization camera makes it possible to sense the complete set of electromagnetic parameters of light incident on the camera.

The present invention in a preferred embodiment involves a polarization viewer that does not require any external mechanical manipulation of a filter to form a transmitted radiance sinusoid. With the sinusoid, polarization states can be mapped into hue, saturation and intensity which is a very convenient representation for a polarization image.

SUMMARY OF THE INVENTION

The present invention pertains to a polarization viewer. The polarization viewer comprises a mechanism or means for forming a broadview image having a spectral width preferably greater than 2 angstroms and 0.50° based on polarization information of a scene, although it can be used in that range. The polarization viewer is also comprised of a mechanism or means for providing polarization information to the forming mechanism or means. The providing mechanism or means is in communication with the forming mechanism or means.

In a first embodiment, the providing mechanism or means includes a camera mechanism or means in communication with the forming mechanism or means. The camera mechanism or means includes a fixed polarizer analyzer disposed such that electromagnetic radiation entering the camera mechanism or means passes through the polarizer analyzer. The providing mechanism or means can also include a mechanism or means for steering a polarization plane of the radiation. The steering mechanism or means is disposed such that radiation passing through the polarizer analyzer first passes through the steering mechanism or means. The steering mechanism or means preferably includes a first twist crystal in a first embodiment and at least a second twist crystal aligned with the first twist crystal such that radiation passing through the first crystal then passes through the second crystal in a second embodiment. Each crystal has a first state and a second state. The first state does not effect the polarization plane of the radiation as the radiation passes through the crystal. The second state rotates the polarization plane of the radiation as the radiation passes through the crystal.

In another embodiment, the providing mechanism or means includes a CCD chip having a plurality of pixels which forms a signal from electromagnetic radiation received at the pixels. The providing mechanism or means also includes a mechanism or means for allowing radiation of a predetermined polarization to pass through each pixel. The allowing mechanism or means is disposed over the chip such that the radiation passes through the allowing mechanism or means before it is received by the chip.

In yet another embodiment, the providing mechanism or means includes a first CCD chip which produces a first signal based on electromagnetic radiation it receives. The providing mechanism or means also includes a first beamsplitter disposed such that radiation reflected by the first beamsplitter is received by the first CCD chip. There is additionally a second CCD chip which produces a second signal based on electromagnetic radiation it receives which is transmitted by the first beamsplitter. The second CCD chip is disposed such that it receives radiation transmitted by the first beamsplitter Moreover, the providing mechanism or means preferably can include a mechanism or means for creating polarization information corresponding to a different polarization orientation than that corresponding with the first or second CCD chip by themselves.

The present invention also pertains to a viewer for forming an image of a scene. The viewer is comprised of a mechanism or means for forming a transmitted radiance sinusoid based on polarization information of a scene and producing the image based on the sinusoid. The viewer is also comprised of a mechanism or means for providing polarization information to the forming mechanism or means. The providing mechanism or means is in communication with the forming mechanism or means.

The present invention additionally pertains to a polarization viewer. The polarization viewer is comprised of a mechanism or means for obtaining polarization information about a scene. The obtaining mechanism or means has no moving mechanical parts. The present invention also pertains to a mechanism or means for forming an image from the polarization information. The forming mechanism or means is in communication with the obtaining mechanism or means.

The present invention also pertains to a viewer that can form a color image with respect to polarization.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
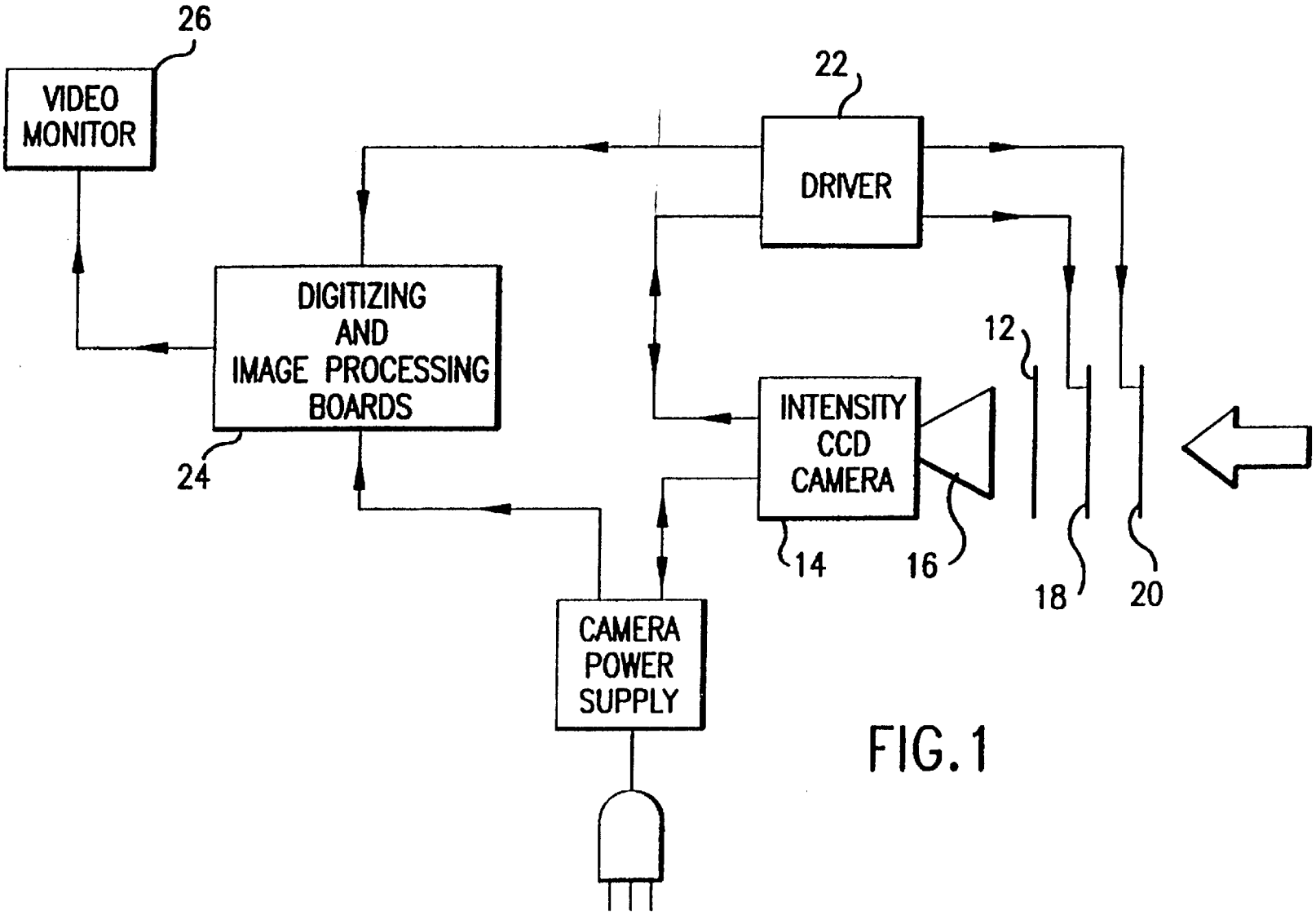
FIG. 1 is a schematic representation of a polarization viewer preferably using liquid crystals.

Referring now to the drawings wherein like reference numerals refer to similar or identical parts throughout the several views, and more specifically to FIG. 1 thereof, there is shown a polarization viewer 10. The polarization viewer 10 is comprised of a mechanism or means for forming a broadview image having a spectral width preferably greater than 2 angstroms and 0.50° based on polarization information of a scene, although it can be used within this range. Preferably, the spectral width is between 100–11,000 nanometers and at least 380–800 nanometers, while the angle can be ±20°. The viewer 10 is also comprised of a mechanism or means for providing polarization information to the forming mechanism or means. The providing mechanism or means preferably includes a camera mechanism or camera means in communication with the forming mechanism or means. The camera mechanism or camera means preferably includes a fixed polarizer analyzer 12 disposed such that electromagnetic radiation entering the camera mechanism or camera means passes through the polarizer analyzer 12. The camera mechanism or camera means also preferably includes a mechanism or means for steering a polarization plane of the radiation. The steering mechanism or means is disposed such that radiation passing through the polarizer analyzer 12 first passed through the steering mechanism or means.

Preferably, the camera mechanism or means includes a camera 14 having a viewing port 16 through which the radiation enters the camera 14. The polarization analyzer 12 and the steering mechanism or means is disposed adjacent the viewing port 16 with the polarization analyzer 12 disposed between the viewing port 16 and the steering mechanism or means such that radiation passing into the viewing port 16, passes first through the steering mechanism or means and then the polarization analyzer 12 before entering the viewing port 16. The camera 14 produces a signal corresponding to the radiation the camera receives.

The steering mechanism or means includes a first twist crystal 18 in a first embodiment and at least a second twist crystal 20 aligned with the first twist crystal 18 such that radiation passing through the first crystal 18 then passes through the second crystal 20 in a preferred second embodiment. Each crystal preferably has a first state and a second state. The first state does not effect the polarization plane of the radiation as the radiation passes through the crystal. The second state rotates the polarization plane of the radiation as the radiation passes through the crystal. The providing mechanism or means can also include a driver 22 in communication with first crystal 18 in the first embodiment and with the first and second crystals 18, 20 and the camera 14 for controlling the state of each crystal in conjunction with the camera 14 in the second embodiment.

The forming mechanism or means preferably includes digitizing and image processing circuit boards 24 which are in communication with the driver 22 and the camera 14. The boards 24 create a polarization image based on the signal produced by the camera 14. The forming mechanism or means can also include a video monitor 26 in communication with the boards 24. The monitor 26 displays the polarization image created by the boards 24.

Preferably, the second state of the first crystal 18 rotates the polarization plane of radiation passing through the first crystal 18 45° and the second state of the second crystal 20 rotates the plane of polarization of rotation passing through the second crystal 20 90°. It should be noted that essentially any different angle for each crystal can be used, but 45° and 90° are preferred. Preferably, the driver 22 controls the states of the crystals such that the polarization plane of radiation over a predetermined period of time passing through the crystals experience sequential rotation of 0°, 45°, 90° and 135°. The driver 22 preferably maintains the crystals at a given state for four frame times of the camera 14 such that the polarization plane experiences the rotation of 0°, 45°, 90° and 135° as the state of the crystals are changed, as shown in FIGS. 2a–2d. Preferably, the boards 24 capture the signal of the camera 14 corresponding to the fourth frame. The camera 14 is preferably a CCD camera. In this way, three points associated with three different polarization orientations are identified to form a transmitted radiance sinusoid and an image obtained therefrom by the boards 24. A more complete description of the sinusoid and image production therefrom is found below.

If less than 3 distinct points with respect to a scene's polarization information are obtained, for instance, with the first embodiment identified above, then a transmitted radiance sinusoid cannot be formed. However, with less than 3 points, there is still valuable information about the scene that can be revealed. For instance, with information only concerning two different polarization orientations and knowledge of the specular plane, specular and diffuse light can be identified or materials with different electrical conductivities can be identified, or partial polarization with respect to $I_{max}$ and $I_{min}$ can be identified. For example, consider using only 1 twist liquid crystal in FIG. 1 with twist 0° degrees and n degrees. Then polarization components can be resolved at these orientations, relative to the transmission axis of the fixed polarizer analyzer. If n=90 (which is the preferred embodiment) then 2 samples of the transmitted radiance sinusoid 90 degrees apart can be done. If these mutually orthogonal directions happen to coincide with the directions of the maximum and minimum polarization components, or, if the specular plane for specular reflection from an object surface is known, then the partial polarization and phase can be computed (i.e., the transmitted radiance sinusoid can be computed). Otherwise, just these 2 component magnitudes are known relative to the transmission axis of the fixed polarizer analyzer.

Figure 3:
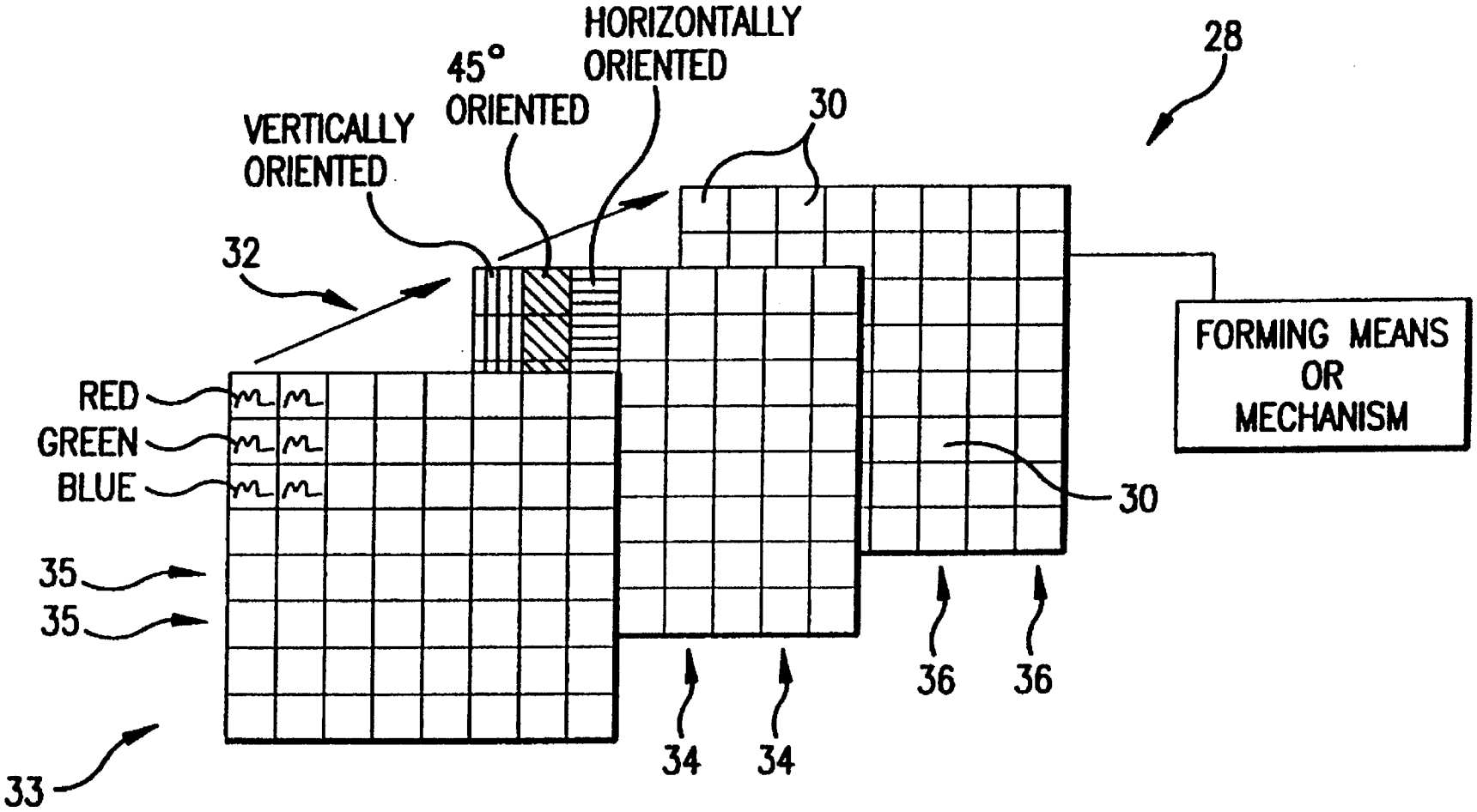
FIG. 3 is a schematic representation of an alternative embodiment of the viewer involving a CCD chip with a layer of polarizing material on each pixel.

In an alternative embodiment, the providing mechanism or means can include a CCD chip 28, such as the same CCD chip that is used in the SONY Camera model XC-77 (note not the camera itself, the chip contained in this camera), having a plurality of pixels 30 which form the signal from electromagnetic radiation received at the pixels 30, as shown in FIG. 3. The providing mechanism or means can also include a mechanism or means for allowing radiation of a predetermined polarization to pass to each pixel 30. The allowing mechanism or means is disposed over the chip 28 such that radiation passes through the allowing mechanism or means before it is received by the chip 28. As described above, the CCD chip 28 can be in communication with the forming mechanism or means which preferably has appropriate digitizing and image processing circuit boards 24 which effectively processes the information from the CCD chip 28 and the monitor 26 connected to such board 24.

The allowing mechanism or means preferably includes a layer 32 of polarization material. The layer 32 is preferably deposited on the CCD chip 28 over each pixel 30 using standard deposition techniques. The layer of polarization material can be, for instance, HN42Hc polaroid material. The layer 32 can be preferably comprised of columns 34 of polarization material. Each column 34 has a predetermined polarization orientation. Preferably, the columns 34 alternate between a vertically oriented polarization angle, a 45° oriented polarization angle with respect to the vertically oriented polarization angle, and a horizontally oriented polarization angle with respect to the vertically oriented angle. Each column 34 corresponds to a column 36 of pixels 30. In this way, three points defining the sinusoid for the corresponding time are identified. It should be noted that essentially any three different polarization orientations can be used for the three different columns 34 that repeat themselves across the chip 28.

If a multispectral based image, for instance, a color, rather than a monochrome based image is desired to be formed, there is a mechanism or means for obtaining polarization information and predetermined spectrums of electromagnetic radiation preferably associated with respective colors of a scene. (It should be noted that the spectral range does not have to be in the visible spectrum. The visualization scheme described below will accommodate for instance UV, about 200 nanometers, or infrared, about 800 nanometers, and represent the same to the human eye.) Additionally, there is a mechanism or means for forming an image of the scene based on the polarization information on a predetermined spectrum's radiation. Preferably, in one such embodiment, the mechanism or means for obtaining polarization information can include the allowing mechanism or means described above, and there can be included a second mechanism or means for allowing radiation with a predetermined spectrum to pass to each pixel 30. The second mechanism or means is disposed over the chip 28 such that radiation passes through the second allowing mechanism or means and the layer 32 of polarization material before it is received by the chip 28. The second mechanism or means preferably includes a second layer 33 of material which allows radiation of a predetermined spectrum to pass to each pixel 30. The second layer 33 is also deposited on the layer 28 of polarization material over each pixel 30 although it could also be deposited under the layer 32 of polarization material. The second layer 33 is comprised of a rows 35 of material which allow radiation of a predetermined spectrum to pass. Each row 35 is associated with radiation of a predetermined spectrum and each row corresponds to a row of pixels. Preferably, the second layer 33 is comprised of rows 35 which alternate between materials that allow radiation in the red colored spectrum range, green colored spectrum range or blue colored spectrum range, respectively, to pass. Thus, the rows 35 alternate between color and the columns 34 alternate between different oriented polarization angles.

Figure 4A:
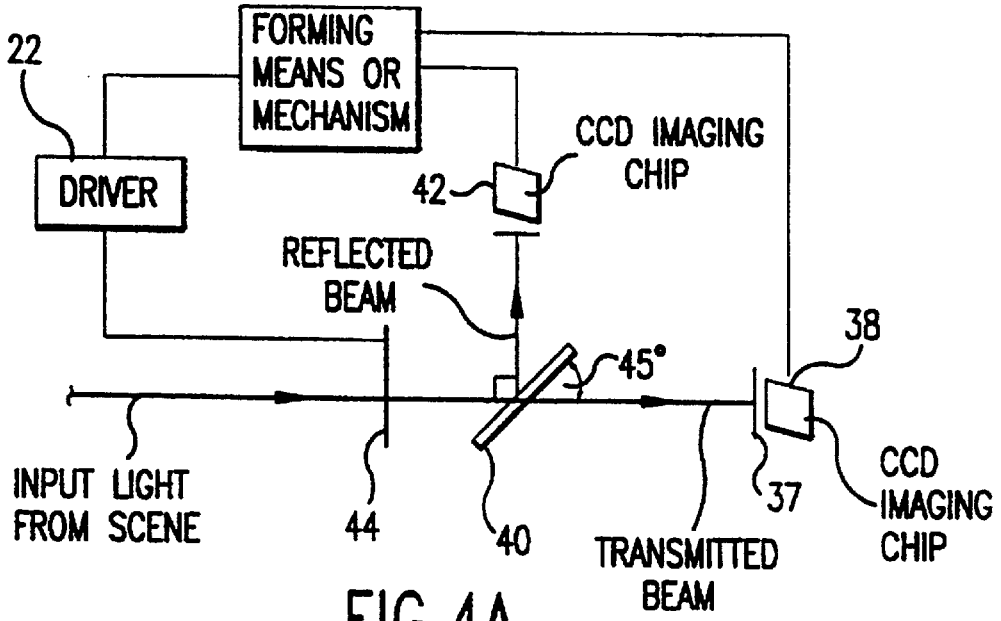
FIG. 4a is a schematic representation of an alternative embodiment of the viewer involving a viewer having two imaging chips, one beamsplitter and a twist crystal.

In another alternative embodiment, the providing mechanism or means includes a first CCD chip 38 which produces a first signal based on electromagnetic radiation it receives, as shown in FIG. 4a. Additionally, the providing mechanism or means can include a first beamsplitter 40 disposed such that radiation reflected by the first beamsplitter 40 is received by the first CCD chip 42. The first CCD chip 42 preferably receives radiation reflected 90° by the first beamsplitter 40. The first beamsplitter 40 can for instance be a 30/70 polarizing beamsplitter. In such a beamsplitter, 30% of transmitted radiation is of the P state and 70% of the transmitted radiation is of the S state. With respect to the reflected radiation, 70% of it is of the P state and 30% is of the S state. As in the case of the crystals or the layer 32, a beamsplitter can be at essentially any angle. There can also be a second CCD chip 42 which produces a second signal based on electromagnetic radiation it receives which is transmitted by the first beamsplitter 40. The second CCD chip 38 is disposed such that it receives radiation transmitted by the first beamsplitter 40. Thus, two different polarization orientations can be obtained. In a second alternative embodiment, the providing mechanism or means can include means for creating polarization information corresponding to a different polarization orientation than that corresponding with the first or second CCD chip 38,42 by themselves. This yields three different polarization orientations.

With respect to the creating mechanism or means, in a first embodiment, there can be included a twist crystal 44 disposed adjacent to the first beamsplitter 40 such that radiation received by the first beamsplitter 40 first passes through the twist crystal 44. Preferably, the first beamsplitter 40 is oriented at a 45° angle relative to radiation incident to it. Similar to the first twist crystal 18 and second twist crystal 20, the twist crystal 44 has a first state and a second state. The first state does not effect the polarization plane of the radiation as the radiation passes through it. The second state rotates the polarization plane of the radiation as the radiation passes through it. The driver 22 is in communication with the crystal 44 and controls the state of the crystal 44. In this embodiment, the driver can be a one-bit driver as opposed to a two-bit driver 22 that is preferred for the above described embodiment. Preferably, when the crystal 44 is in the second state, the polarization plane of radiation passing therethrough is rotated 45°. In this embodiment, the boards 24 are connected to the first CCD chip 38 and second CCD chip 42 to receive the first and second signals, respectively, to form the polarization image. In yet another alternative embodiment, there can be just a first CCD chip 38 with twist crystal 44 disposed in front of it such that any electromagnetic radiation received by the first CCD chip 38 passes through the twist crystal 44. In this way, two different polarization orientations of a scene can be obtained, rather than three in the former embodiment of this paragraph.

In another embodiment and as shown in FIG. 4a, the beamsplitter can be a nonpolarizing beamsplitter meaning that the reflected and transmitted beams preserve the incident polarization state up to a good approximation. With one polarizing filter 37 placed on each of the CCD imaging chips, each at a different orientation, with known relative reflection and transmission respective to the nonpolarizing beamsplitter, 2 unique polarization components can be resolved. If horizontal and vertical orientations are used for the orientations of the polarizing filters, for instance, then the P and S states can be resolved. This is the preferred embodiment. With a twist crystal placed in front of the nonpolarizing beamsplitter, the transmitted radiance sinusoid can be recovered from 4 uniquely sampled points. A twist crystal 44 with n=45 degrees is preferred.

Figure 4B:
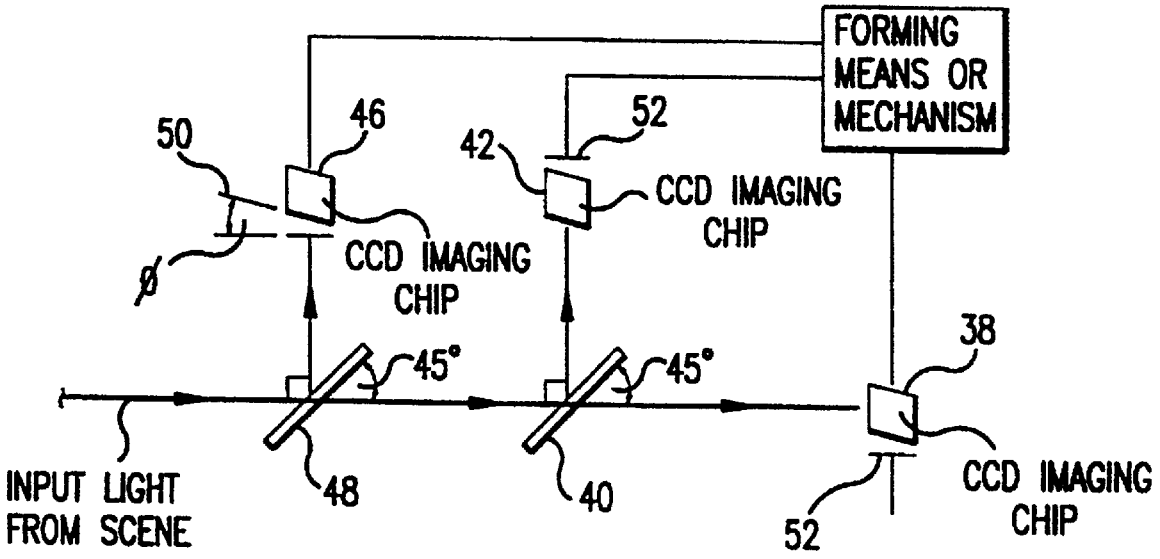
FIG. 4b is a schematic representation of an alternative embodiment of the viewer involving a viewer having three CCD imaging chips and two beamsplitters.

In another alternative embodiment of the generating mechanism or means, there is included a third CCD chip 46 which produces a third signal based on electromagnetic radiation it receives. The first, second and third chips can be the same CCD chip that is used in the SONY Camera model XC-77. Additionally, in this embodiment, and as shown in FIG. 4b, there is a second beamsplitter 48 disposed such that radiation reflected by the second beamsplitter 48 is received by the third CCD chip 46 and radiation transmitted by the second beamsplitter 48 is incident upon the first beamsplitter 40. The third CCD chip 46 is preferably oriented in a different plane 50 than a plane 52 in which the first and second CCD chips 38, 42 are oriented. Preferably, the first and second beamsplitter 40, 48 are oriented at a 45° angle relative to radiation incident to them. The first CCD chip 38 and the third CCD chip 46 each receive radiation reflected 90° by the first beamsplitter 40 and the second beamsplitter 48, respectively. Preferably, the different plane 50 in which the third CCD chip 46 is oriented is at a 45° angle with respect to the plane 52 in which the first and second CCD chips 38, 42 are oriented, although essentially any angle other than 0° with respect to plane 52 would suffice. Each of the chips are in communication with boards 24 that receive the respective signals and form a polarization image therefrom.

In FIG. 4b with 3 CCD chips, the first beamsplitter 48 is a nonpolarizing beamsplitter and the second beamsplitter 40 is a polarizing beamsplitter. The polarizer 50 placed in front of CCD chip 40 can be oriented anyway except horizontal or perpendicular to the page. It is preferred that it be oriented at 45 degrees. The transmitted radiance sinusoid is sampled in 3 places, at P at S and at an intermediate orientation defined by the orientation of the polarizer 50, and the sinusoid can be uniquely recovered. Of course, all reflecting and transmitting characteristics of the nonpolarizing, and, polarizing beamsplitters are known.

In yet another embodiment, if a color image is desired to be obtained, then the first CCD chip 38, the second CCD chip 42 and the third CCD chip 46 are each associated with a unique predetermined spectrum of radiation. In this embodiment, the first, second and third chip can be the same CCD chip that is used in the SONY Camera model XC-77. It should be noted that the third CCD chip 46 in this color image embodiment can be in the same plane 50 as the first and second CCD chips. Preferably, the first CCD chip 38, the second CCD chip 42 and the third CCD chip 46 are associated with radiation in the red, green and blue spectrum range, respectively. Preferably, in this color image embodiment, there is a mechanism or means for allowing radiation of a predetermined polarization to pass to each pixel 30 with respect to each chip. The allowing mechanism or means is disposed over each chip such that radiation passes through the allowing mechanism or means before it is received by the respective chip. Preferably, the allowing mechanism or means includes a layer 32 of polarization material. The layer 32 is deposited over each pixel of the respective CCD chip. Preferably, the layer 32 is comprised of columns 34 of polarization material. Each column 34 has a predetermined polarization orientation. Each column 34 corresponds to the column of pixels 30. The layer 32 is preferably comprised of columns 34 which alternate between a first oriented polarization angle, a second oriented polarization angle different from the first oriented polarization angle, and a third oriented polarization angle different from the first and second oriented polarization angles. Preferably, the layer 32 is comprised of columns 34 which alternate between a vertically oriented polarization, a 45° oriented polarization angle with respect to the vertically oriented polarization angle and a horizontally oriented polarization angle with respect to the vertically oriented angle, as shown in FIG. 3. In this way, with respect to each chip, a transmitted radiance sinusoid is formed for each color associated with each chip. Of course, there can be only one or only two chips each of which is associated with a unique color in alternative embodiments.

A polarization image as defined here with respect to a color visualization scheme applies to a "monochrome"

image which is either exclusive to one spectral wavelength of incident light, or, some spectral band of wavelengths of incident light. The color label has nothing to do with the physical spectral content of the light that produced the polarization image. There are a number of other ways to "visualize" polarization, such as with different texture representations composed of spatial variations. For each broad spectral band or one wavelength spectral band, a polarization image can be constructed using a given visualization scheme. Given 2 or more independent visualization schemes, independent in the "visual" sense such as color is independent visually from texture, these independent visualization schemes can be combined to produce polarization image visualizations for 2 or more spectral wavelengths or spectral broadbands.

In yet another embodiment, the mechanism or means for forming can be directed towards the formation of a transmitted radiance sinusoid based on polarization information of the scene and producing the image based on the sinusoid. In this embodiment, the providing mechanism or means provides information about different planes of polarization of electromagnetic radiation from the scene at the same time. The embodiments described above concerning the CCD chips 28, 38, 42 and 46 are examples of how such information can be obtained. The associated elements described with the respective chips can provide the image.

With respect to this embodiment involving a mechanism or means for forming the sinusoid, if the different planes of polarization of electromagnetic radiation from the scene are not necessarily at the same time, then the embodiment described above with respect to the first twist crystal 18 and second twist crystal 20, or chip 38 and 42 and twist crystal 44 are examples of how the polarization image can accordingly be formed.

In yet another embodiment of a polarization viewer 10, it is comprised of a mechanism or means for obtaining polarization information about a scene. The obtaining mechanism or means has no moving mechanical parts. The polarization viewer 10 is also comprised of a mechanism or means for forming an image from the polarization information. The forming mechanism or means in communication with the obtaining mechanism or means. The above-mentioned embodiments are examples of such a viewer 10.

The present invention also pertains to a method for interpreting a scene. The method comprises the steps of (a) obtaining polarization information concerning three different polarization orientations of a scene. Then there is the step (b) of forming a transmitted radiance sinusoid. Next there is the step (c) of determining partial polarization of the scene. Then there is the step (d) of identifying colors associated with partial polarization and phase in regard to the sinusoid, preferably with respect to each pixel of a chip or camera. Next there is the step (e) of producing an image of the scene based on the colors. Preferably after step (e), there can be the step (f) of responding to the image.

Figure 17:
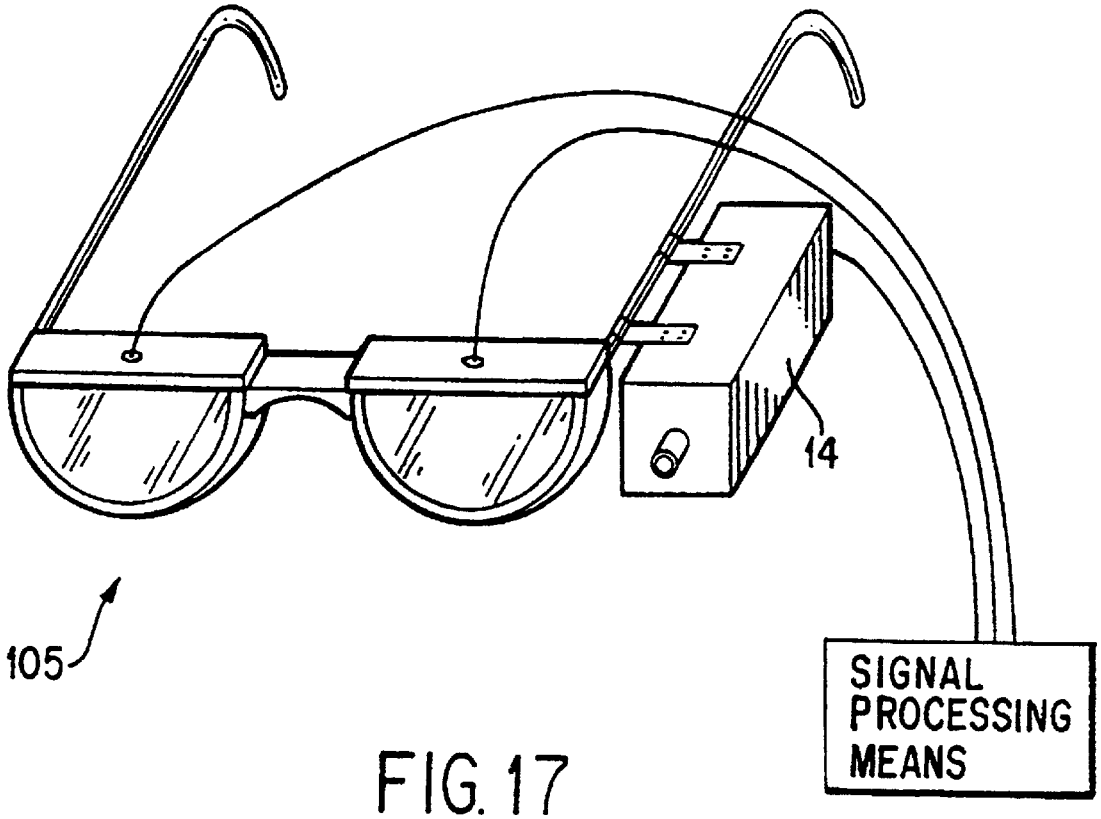
FIG. 17 is a schematic representation of polarization goggles.
Figure 18:
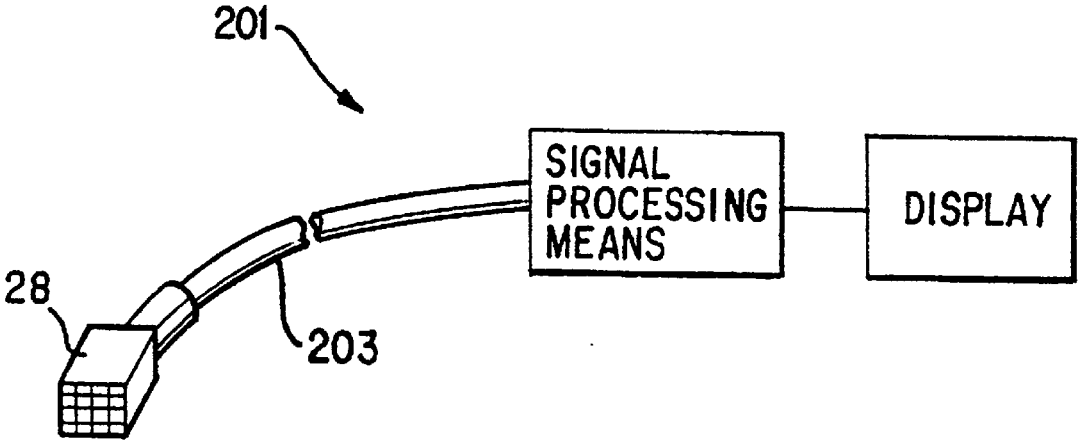
FIG. 18 is a schematic representation of an endoscope.

In one embodiment, the scene is of at least a portion of a patient's body and step (f) includes the step (g) of applying a treatment to the patient based on the polarization image. For instance, a doctor wearing polarization goggles 105 or glasses, such as those of NEC computer where the image would be displayed on lenses would better be able to identify the boundary between, for example, the end of a tumor and the beginning of healthy tissue. The polarization camera could be adjacent or attached to the goggles, as shown in FIG. 17. This would assist the doctor in cutting away all of the tumor. The patient may be enhanced with the use of various dyes to distinguish between healthy and diseased tissue, such as photoluminescent dyes. Similarly, polarization images of the body could indicate the presence of diseased tissue and thus indicate if a specific drug treatment is required to combat the diseased tissue and cure the patient.

Alternatively, the chip 28 could be placed at the end of a cable 203 of an endoscope 201. The chip 28 would be similar in function and connection to a TV camera of traditional endoscopes, but the image would be provided from the CCD chip 28. Signal processing means, such as that described above, could form the polarization image on a display.

The scene can also be of at least a portion of an object and step (f) includes the step (h) of repairing or replacing the object that the polarization image indicates the same is necessary. For instance, if the object is an electronic component made of materials having different electrical conductivities, then the different materials would indicate different colors with respect to a polarization image. The image would indicate whether the materials are in proper relationship to each other, for example, necessary or one properly deposited on the electronic component.

The step (f) can include the step (i) of differentiating between specular and diffuse radiation. For instance, a robot could easily identify an image that is formed of radiation or reflected from a mirror and radiation reflected directly from an object. After the step (i), there could be the step (j) of moving a robot with respect to the specular and diffuse radiation so that it properly grabs an item, for example, on an assembly line, or better navigates terrain along which it is moving. See Robotics in Service by Joseph F. Engelberger, MIT Press (1989); Robotics at Work by John Hartley, North Holland Publishing Co. (1983); Smart Robots by Daniel Hunt, Chapman & Hall Publishing Co. (1985), incorporated by reference, for examples of robots which could receive polarization information from viewers described above to better assist them in their operation.

The step (a) can include the step of placing a camera in position with respect to the scene and applying a desired voltage at desired times to a twist crystal so the camera can receive different polarization orientations of electromagnetic radiation from the scene is more fully explained above. Alternatively, the step (a) could include the step (l) of transmitting a portion of electromagnetic radiation from the scene to a beamsplitter to a first CCD chip and the step (m) of reflecting another portion of electromagnetic radiation to a second CCD chip as described above.

In the operation of the polarization viewer 10, as shown in FIG. 1, there is an intensity CCD camera 14 having a viewing port 16. In front of the viewing port 16 is a fixed polarizer analyzer 12 through which electromagnetic radiation passes before entering the viewing port 16. In front of the polarization analyzer 12 is a first twist crystal 18 and a second twist crystal 20 in parallel with the first twist crystal 18. Electromagnetic radiation passing through the fixed polarizer analyzer 12 first passes through the first twist crystal 18 and second twist crystal 20.

Connected to the first twist crystal 19 and second twist crystal 20 is a two-bit driver 22 which controls the state of the crystals. The driver 22 is also connected to the intensity CCD camera 14 such that the driver 22 receives the video out signal produced by the intensity CCD camera 14. The driver 22 uses this video out signal it receives to coordinate the signals the crystals such that the crystals are in a desired state at a desired time so the camera 14 can receive electromagnetic radiation of a desired polarization orientation at a given time.

Figure 2A:
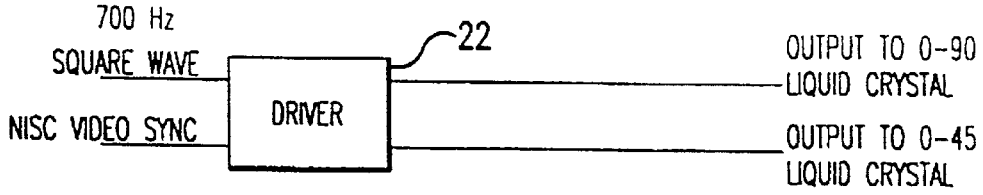
FIGS. 2a–2d are schematic representations of the signals produced by a driver of the present invention for the crystals of the viewer.
Figure 2B:
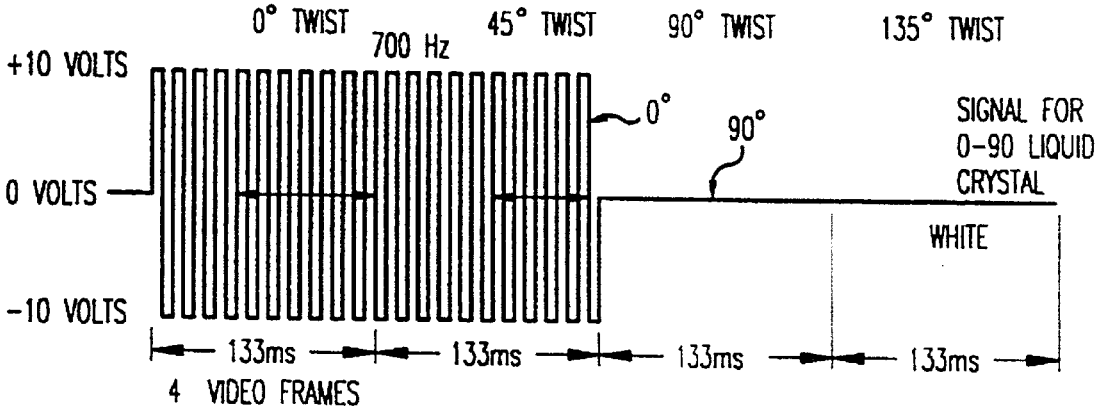
Figure 2C:
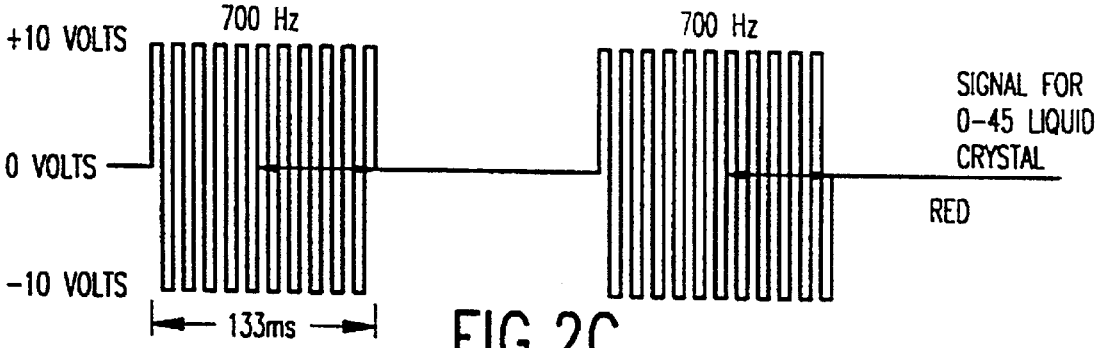
Figure 2D:
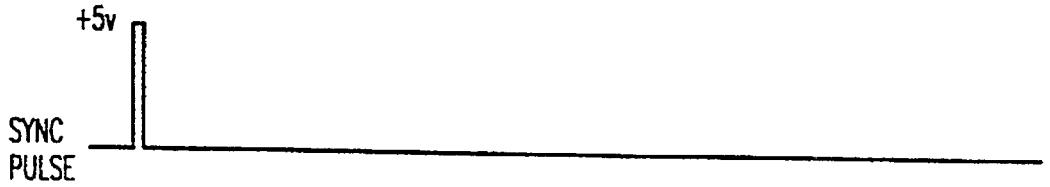

As shown in FIGS. 2a–2b, the driver and output signal to the first twist crystal 18 lasts 266 milliseconds going from −10 volts to +10 volts at 700 hertz. This 266 millisecond, ±10 volt, 700 hertz signal corresponds to 8 video frames, with 4 video frames corresponding to 133 milliseconds. When the first twist crystal 18 receives the ±volt signal, it is in the first state and does not rotate the plane of polarization of electromagnetic radiation that is passing through it.

After the 266 milliseconds passes, then there is a period of 266 milliseconds where there is a 0 voltage signal provided to the first crystal 18. When the first crystal 18 receives the 0 volt signal, it is in the second state and rotates the plane of polarization electromagnetic radiation passing through it by 90°.

The driver is concurrently providing a signal that is between −10 volts and +10 volts for 133 milliseconds at 700 hertz for 4 video frames, then produces 0 volts for 4 video frames, then produces a signal between −10 volts and +10 volts for 4 video frames and then produces a signal 0 volts for 4 video frames. The sequence then repeats itself as does the sequence for the first twist crystal 18.

As FIG. 2 shows, when the first twist crystal 18 receives the signal from the driver of between −10 volts and +10 volts for 4 video frames, the same type of signal is also being received by the second twist crystal. Since both twist crystals are in the first state, there is no rotation of electromagnetic radiation passing through the first or second crystals to the polarization analyzer 12. During the next 133 milliseconds, the first twist crystal 18 continues to receive a signal between −10 volts and 10 volts and 700 hertz while the second twist crystal 20 receives the signal of 0 volts. This results in the electromagnetic radiation passing through the first and second crystals rotating the plane of polarization of electromagnetic radiation 45°. During the next 133 milliseconds, the signal to the first crystal 18 is 0 volts while the signal to the second twist crystal 20 is between −10 and +10 volts at 700 hertz. This results in the first twist crystal being in the second state and rotating the plane of polarization of the electromagnetic radiation passing through it 90° while the second twist crystal allows electromagnetic radiation to pass through it unaffected. During the next 133 milliseconds, the first twist crystal 18 and second twist crystal 20 receive a signal from the driver of 0 volts causing each twist crystal to be in a second state. What results is electromagnetic radiation passing through the first crystal having its plane of polarization rotating 90° while the radiation then passing through the second twist crystal 20 has the plane of polarization rotate an additional 45°, resulting in a total rotation of the plane of polarization of the electromagnetic radiation of 135° which is received by the polarizer analyzer 12. At any given time, the fixed polarizer analyzer 12 only allows a predetermined plane of polarization to pass through it to the camera 14.

The camera 14 captures the fourth video frame of every 4 video frames in conjunction with the twist crystals. This is to allow the crystal to experience its full relaxation time after a new different voltage is applied to it before the next picture is taken. At the same time, the driver 22 provides a 700 hertz square wave synchronization pulse to the digitizing and image processing boards 24 to cause them to process the video signal from the camera 14 at the proper time. The boards 24 produce the, polarization image signal which is passed to a video monitor 26 where it is displayed. The video out signal received by the boards 24 comes from the camera power supply which not only provides power to the camera 14 but also receives the video out signal and passes it to the processing boards 24.

In the three chip beamsplitter configuration of a viewer 10 as shown in FIG. 4b, there is a first CCD chip 38 which receives electromagnetic radiation transmitted through a first beamsplitter 40 which is disposed before the first CCD chip 38. A second CCD imaging chip 42 receives electromagnetic radiation that is reflected by the first beamsplitter 40. The first beamsplitter forms an angle of 45° with electromagnetic radiation incident upon it.

There is a second beamsplitter 48 disposed before the first beamsplitter 40 such that the first beamsplitter 40 receives electromagnetic radiation transmitted through the second beamsplitter 48. A third CCD imaging chip 46 is disposed to receive electromagnetic radiation reflected by the second beamsplitter 48. The third CCD chip 46 is oriented at a 45° plane 50 relative to the plane 52 in which the first and second CCD chips are oriented. Additionally, the second beamsplitter 42 forms a 45° angle with respect to electromagnetic radiation incident to it.

Digitizing and imaging boards 24 are connected to the first, second and third imaging chips and receive signals therefrom corresponding to electromagnetic radiation received by the chips. Each signal is with respect to a different polarization orientation. For instance, the first imaging chip can be corresponding to a 0° orientation, while the second imaging chip 42 is at a 45° orientation with respect to the first imaging chip, and the third imaging chip 46 is at a 90° orientation with respect to the first imaging chip 38. In this way, the processing boards receive information to form three distinct points to form the sinusoid. The boards 24 can process the signals from the chips and produce an image of the video monitor 26.

Referring to FIG. 4a, there is shown a two-chip beamsplitter viewer. With respect to the two-chip beamsplitter viewer 10, the first and second imaging chips and first beamsplitter 40 are oriented the same as that described above with respect to the three-chip beamsplitter configuration. The difference is that there is a twist crystal 44 disposed before the first beamsplitter 40 such that electromagnetic radiation received by the first beamsplitter 40 first passes through the twist crystal 44. The twist crystal 44 has a first state where the plane of polarization of electromagnetic radiation is not rotated, and a second state which rotates the plane of polarization of electromagnetic radiation passing through it by 45°. There is a one-bit driver 22 connected to the twist crystal 44 causing it to go between a first state and a second state at a desired time in synchronization with the first and second imaging chips. When the twist crystal is in a first state, then the first imaging chip can receive electromagnetic radiation at, for instance, an orientation corresponding to 0° while the second CCD chip 42 can receive electromagnetic radiation having a plane of polarization oriented 45° with respect to the first imaging chip orientation. When the driver 22 causes the twist crystal 44 to enter a second state, then the electromagnetic radiation passing through the twist crystal 44 is rotated 45°. This results in the first imaging chip 38 receiving electromagnetic radiation when the plane of polarization has been rotated 45° with respect to the first CCD chip 38 when the twist crystal 44 is in a first state. Similarly, the second CCD chip 42 receives electromagnetic radiation whose plane of polarization has been rotated 90° with respect to the first CCD imaging chip's orientation when the twist crystal 44 is in the first state. This results in three distinct orientation points to form the sinusoid for a given time period.

The configuration in FIG. 4a is comprised of 2 CCD chips with a polarizing beamsplitter The polarizing beamsplitter such as a Melles Griot model #03BTF021, transmits and reflects P and S polarization components of the incident beam in different proportions. The P and S polarization components are parallel and perpendicular, respectively, to the specular plane with respect to the beamsplitter. So for FIG. 4a, the P component is in the plane of the page, and the S component is perpendicular to the page. In general:

$$aP+bS=I_{transmitted}$$

$$(1-a)P+(1-b)S=I_{reflected}$$

where a+b=1. a, b≧0. The coefficients a, b are dependent upon which model beamsplitter is used. This results in the solution $$S=(I_{transmitted}(1-a)-aI_{reflected})/(b-a),$$

$$P=(I_{transmitted}(1-b)-bI_{reflected})/(a-b).$$

If the P and S directions happen to coincide with the directions of the maximum and minimum polarization components, or, if the specular plane for specular reflection from an object surface is known, then the partial polarization and phase can be computed (i.e., the transmitted radiance sinusoid can be computed). Otherwise, just the P and S component magnitudes are known with respect to the mutually orthogonal directions parallel and perpendicular to the specular plane respective to the beamsplitter.

By adding a single liquid crystal to FIG. 4a with the CCD chips and beamsplitter the P and S components can be measured respective to two mutually orthogonal orientations. With 0 degree twist, the P and S components orientations are parallel and perpendicular to the page, with n degree twist the P and S components are n degree rotations of parallel and perpendicular to the page. As long as n DOES NOT equal 90 degrees, the transmitted radiance sinusoid is being sampled in 4 unique points and can be uniquely recovered independent of any knowledge of where the specular plane is. N=45 degrees is the preferred embodiment.

In the embodiment of a single CCD chip 28, as shown in FIG. 3, having pixels 30 and columns 34 formed of a layer of polarization material 32 over the pixels 30, the three points for the formation of the sinusoid are obtained by a first column having vertically oriented polarization material over a first column of pixels. A second column adjacent to the first column has polarization material oriented 45° with respect to the vertically oriented polarization of the first column. Also, a third column adjacent the second column has polarization material oriented horizontally with respect to the vertically oriented polarization material. This order of columns repeats itself until the entire CCD chip 28 is covered. The boards 24 connected to the chip 28 receives signals from the various pixels of the different columns resulting in three different signals corresponding to three different polarization orientations as received by the chip 28. That is, the electromagnetic radiation passes through the polarization layer 32 before it strikes the pixels of the chip. As the electromagnetic radiation passes through a given column 34 of polarization material, the plane of polarization of the electromagnetic radiation passing through a given column 34 is caused to orient in conjunction with the orientation of the polarization material of that column whereafter it is received by the pixel thereunder.

The polarization state of light characterizes its complete description as an electromagnetic wave, apart from wavelength. The electric field oscillation for light in general can be represented by the superposition of 2 mutually orthogonal waveforms. When this superposition is deterministic, the time evolution of the tip of the electric field traces out an ellipse in the plane perpendicular to the light wave's direction of travel, and such light is said to be completely polarized. The shape of this ellipse is dependent upon the phase difference of the deterministic superposition of the 2 mutually orthogonal waveforms. Linear polarized light results from a degenerate ellipse when these waveforms are either at 0° or 180° relative phase. Unpolarized light results from the completely non-deterministic superposition of 2 equal amplitude mutually orthogonal waveforms. Most light emitted from incandescent light sources is of this type. The time evolution of the tip of the electric field for unpolarized light is a non-deterministic isotropic orientation distribution in the plane perpendicular to the light wave's direction of travel. For a formal mathematical description of polarization of light see Born and Wolf (M. Born and E. Wolf. Principles of Optics, Pergamon Press, 1959) or Clarke and Grainger (D. Clarke and J. F. Grainger. Polarized Light and Optical Measurement. Pergamon Press, 1971).

Figure 5:
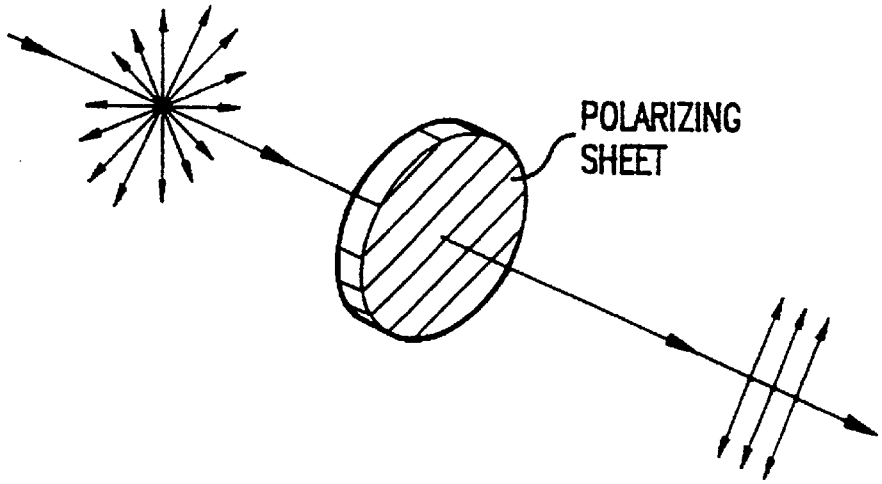
FIG. 5 is a representation of what happens to the isotropic electric field orientation distribution of an unpolarized light wave passing through a linear polarizing filter.
Figure 6:
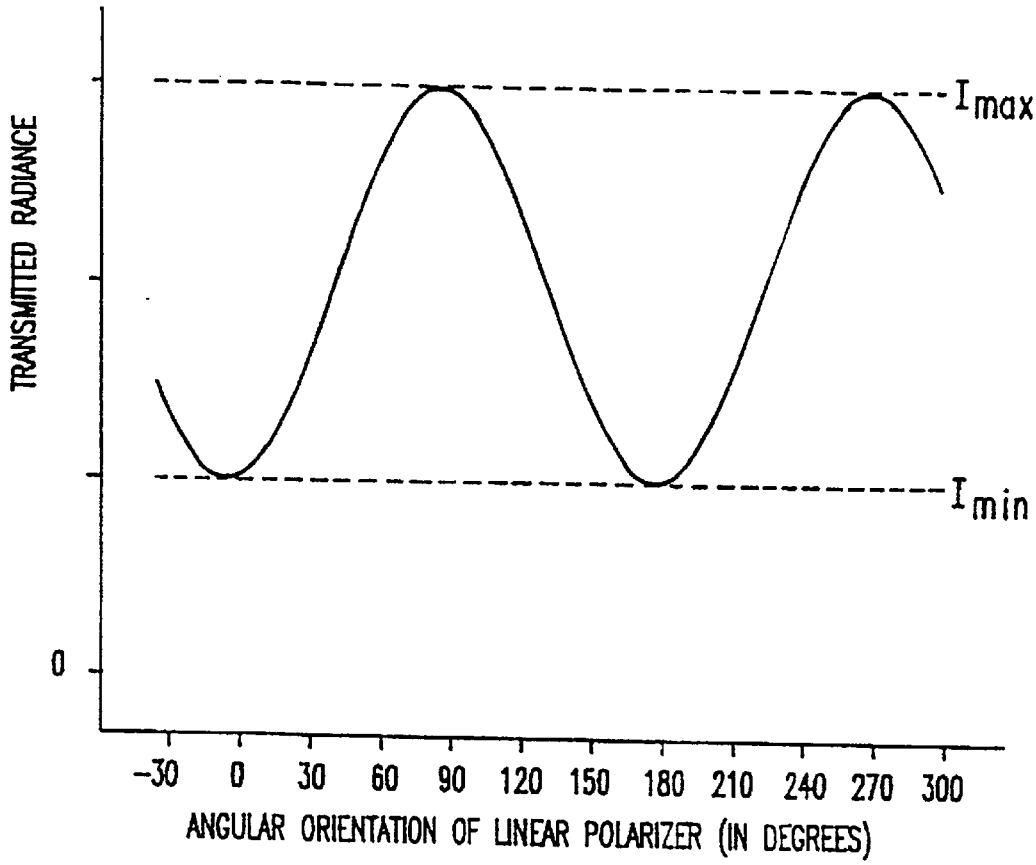
FIG. 6 is a graph depicting a transmitted radiance sinusoid.

Unpolarized light reflected off a material surface becomes partially polarized meaning that the polarization state can be represented as the sum of the unpolarized state and a completely polarized state. Unpolarized light reflected from objects is almost always partially linearly polarized meaning that the completely polarized component is linearly polarized. An exception to this occurs when there is multiple specular intereflection amongst metals producing somewhat of an elliptical completely polarized component. However, the assumption of partially linearly polarized reflected light is very accurate almost all the time. The polarization state of partially linearly polarized light can be measured using only a linear polarizing filter. FIG. 5 shows what happens to the isotropic electric field orientation distribution of an unpolarized light wave passing through such a filter. Only the component of the electric field parallel to the transmission axis is transmitted. It turns out that the radiance of unpolarized light passing through a polarizing filter is constantly one-half the original light radiance regardless of the orientation of the polarizing filter. The transmitted radiance for a partially linearly polarized light wave in general is sinusoidal as a function of polarizer orientation oscillating between a minimum and a maximum every 90°. This will be termed the transmitted radiance sinusoid. FIG. 6 depicts a transmitted radiance sinusoid with minimum occurring exactly at the zero reference. Referring to FIG. 6, it can be shown (D. Clarke and J. F. Grainger. Polarized Light and Optical Measurement. Pergamon Press, 1971, incorporated by reference) that the difference $I_{max}-I_{min}$ represents the magnitude of the linearly polarized component of the original light, while the sum $I_{max}-I_{min}$ represents the total radiant intensity of the original light. The ratio of partial polarization:

$$\text{partial polarization}=I_{max-Imin/Imax+Imin}$$

which varies between 0 and 1 inclusive therefore represents the fraction of light that is linearly polarized. At 0 partial polarization (i.e., unpolarized light) the transmitted radiance sinusoid is a flat horizontal line and the partial polarization is zero. For linearly polarized light $I_{min}=0$ (occurring when the transmission axis of the polarizer is perpendicular to the orientation of the linearly polarized light) and therefore the partial polarization is 1.

The polarization state of partially linearly polarized light can be characterized uniquely by the transmitted radiance sinusoid. The transmitted radiance sinusoid can be completely described by the parameters, $I_{min}$, $I_{max}$, and the phase, θ, of the sinusoid with respect to some reference zero.

Alternatively, and more directly related to visual features extracted from polarization-based methods, the transmitted radiance sinusoid can be completely described by the parameters:

$$\text{(partial polarization)}\ \frac{I_{max}-I_{min}}{I_{max}+I_{min}},\quad \text{(total intensity)}\ I_{max}+I_{min},\ \text{(phase)}\ \theta. \tag{1}$$

Figure 7:
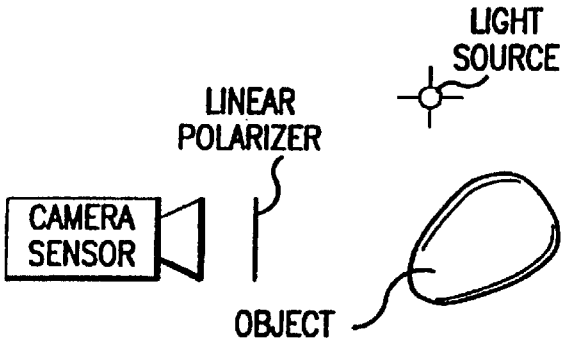
FIG. 7 is a schematic representation of a polarizing filter in front of an intensity camera.

A very simple way of implementing the computation of the polarization state of light incident upon each pixel in an image is to place a polarizing filter in front of an intensity camera as in FIG. 7 and derive the transmitted radiance sinusoid for each pixel. As 3 points determine a sinusoid, at least 3 images are required to be taken respective to 3 unique orientations of the polarizing filter within a 180° range. Using more than 3 images overconstrains the determination of the transmitted radiance sinusoid and a nonlinear optimization technique such as Levenberg-Marquadt is quite easy to apply. Using 3 images alone gives good accuracy in measuring reflected partially linear polarization states. Good success in deriving the transmitted radiance sinusoid can be had by obtaining polarization component images at polarizer orientations 0°, 45°, and, 90° on the polarizer ring vernier without even knowing what these angles are relative to the transmission axis of the polarizer (i.e., all that is known is that these angles are 45° apart). The image irradiances obtained at each pixel are $I_0$, $I_{45}$, $I_{90}$ respective to each of the relative polarizer orientations. If 0 represents where $I_{min}$ occurs relative to 0° on the polarizer ring vernier, then the derivation of the 3 parameter expressions in equation 1 are:

$$\theta=(1/2)\tan^{-1}\left(\frac{I_0+I_{90}-2I_{45}}{I_{90}-I_0}\right),\quad I_{max}+I_{min}=I_0+I_{90},\quad \frac{I_{max}-I_{min}}{I_{max}+I_{min}}=\frac{I_{90}-I_0}{(I_{90}+I_0)\cos 2\theta}. \tag{2}$$

$$\text{If } (I_{90}<I_0)\ [(\text{If } I_{45}<I_0\ \theta=\theta+90 \text{ else } \theta=\theta-90]$$

A good deal has been published about how important physical constraints relevant to image understanding can be extracted from these measured polarization parameters (L. B. Wolff. Surface orientation from polarization images. In Proceedings of Optics, Illumination and Image Sensing for Machine Vision II, Volume 850, pages 110–121, Cambridge, Mass., November 1987. SPIE; L. B. Wolff. Polarization-based material classification from specular reflection. IEEE Transactions on Pattern Analysis and Machine Intelligence (PAMI), 12(11):1059–1071, November 1990; L. B. Wolff and T. E. Boult. Constraining object features using a polarization reflectance model. IEEE Transactions on Pattern Analysis and Machine Intelligence (PAMI), 13(7):635–657, July 1991; L. B. Wolff. Polarization Methods in Computer Vision. PhD thesis, Columbia University, January 1991; T. E. Boult and L. B. Wolff. Physically-based edge labeling. In Proceedings of IEEE Conference on Computer Vision and Pattern Recognition (CVPR), Maui, June 1991).

Figure 8:
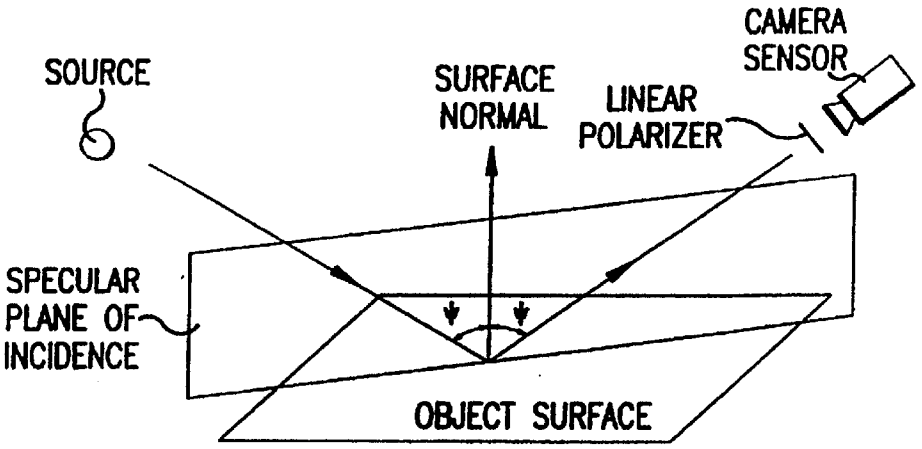
FIG. 8 is a schematic representation of a specular plane of incidence with respect to a camera sensor.
Figure 9:
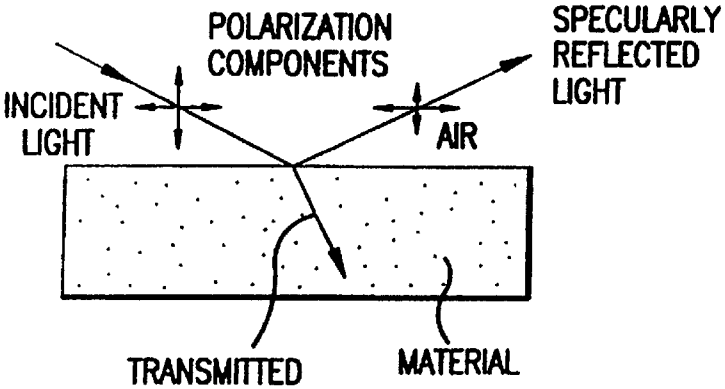
FIG. 9 is a schematic representation of incident light striking a dielectric material.

FIG. 8 depicts the specular plane of incidence, also known simply as the specular plane, determined by the incident light direction and the viewing direction of the camera sensor. This is the plane in which specular reflection occurs into the camera sensor. Unpolarized light can be represented as the non-deterministic superposition of a waveform parallel to the specular plane, with an equal amplitude waveform perpendicular to the specular plane. Upon specular reflection, both waveforms are attenuated according to the Fresnel reflection coefficients, (R. Siegal and J. R. Howell, Thermal Radiation Heat Transfer, McGraw-Hill, 1981; L. B. Wolff. Surface orientation from polarization images. In Proceedings of Optics, Illumination and Image Sensing for Machine Vision II, Volume 850, pages 110–121, Cambridge, Mass., November 1987. SPIE; L. B. Wolff and T. E. Boult. Constraining object features using a polarization reflectance model. IEEE Transactions on Pattern Analysis and Machine Intelligence (PAMI), 13(7):635–657, July 1991, incorporated by reference. The parallel waveform is attenuated more than the perpendicular waveform so that specular reflection becomes partially linearly polarized with a larger waveform component perpendicular to the specular plane than parallel to it as shown in FIG. 9. Hence, the polarization state of specularly reflected light is the sum of an unpolarized state with a completely linearly polarized state whose plane is perpendicular to the specular plane. The resulting measured transmitted radiance sinusoid should exhibit a minimum when the polarizer is oriented parallel to the specular plane, and exhibit a maximum when the polarizer is oriented perpendicular to the specular plane.

Figure 10:
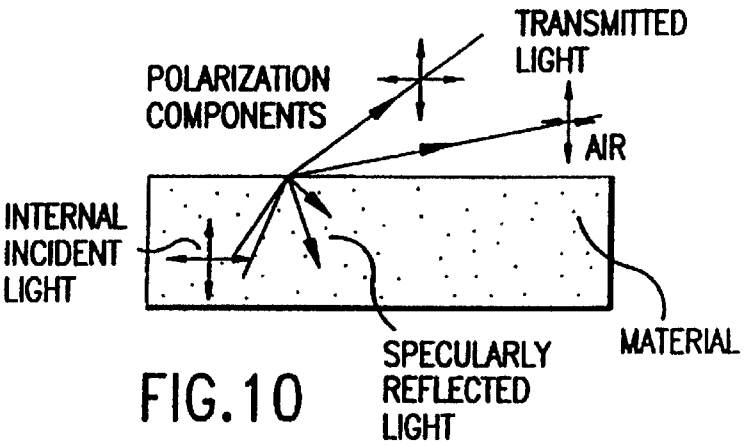
FIG. 10 is a schematic representation of a change in polarization state of diffuse reflected light as it is refracted from within a dielectric into air.

The polarization state of diffuse reflection is most of the time unpolarized. However, near occluding contours where surface orientation normals are almost orthogonal to viewing, diffuse reflection from inhomogeneous dielectric surfaces (e.g., plastic, ceramic, rubber, etc. . . ) can become significantly partially linearly polarized. Practically all of diffuse reflection arising from inhomogeneous dielectric surfaces results from penetration of light into the surface, multiple subsurface scattering, and then refraction back out into air. FIG. 10 depicts the change in polarization state of diffuse reflected light as it is refracted from within the dielectric into air. Before refracting out into air the polarization state of light is assumed to be unpolarized. For most angles of refraction with respect to the surface normal, the refracted light making up diffuse reflection remains essentially unpolarized. However, above 60° between the surface normal and the viewing direction, refraction produces a significant partial linear polarization. At these high angles the electric waveform perpendicular to the emittance plane, determined by the surface normal and the viewing direction, is much more attenuated than the electric waveform parallel to the emittance plane. The polarization state of diffuse reflection near occluding contours is the sum of an unpolarized state with a completely linearly polarized state whose plane is parallel to the emittance plane. The resulting measured transmitted radiance sinusoid should exhibit a minimum when the polarizer is oriented perpendicular to the emittance plane, and exhibit a maximum when the polarizer is oriented parallel to the emittance plane.

In summary, significant partial polarization (i.e., above 10%) in a scene can be due to specular reflection and/or diffuse reflection from inhomogeneous dielectric objects near occluding contours. For emittance and specular planes coinciding near an occluding contour, the transmitted radiance sinusoids for the specular and diffuse reflection components are respectively 90° out of phase. This is an important physical principle that can be exploited to help distinguish between partial polarization due to specular reflection and diffuse reflection. While most of the time the specular and emittance planes are unknown, additional polarization principles can be exploited to identify specularity, and, occluding contour regions and edges in a scene, (L. B. Wolff. Polarization Methods in Computer Vision. PhD thesis, Columbia University, January 1991; L. B. Wolff and T. E. Boult. Constraining object features using a polarization reflectance model. IEEE Transactions on Pattern Analysis and Machine Intelligence (PAMI), 13(7):635–657, July 1991,incorporated by reference). Adding heuristics about physical size can help physical edge labeling (T. E. Boult and L. B. Wolff. Physically-based edge labeling. In Proceedings of IEEE Conference on Computer Vision and Pattern Recognition (CVPR), Maui, June 1991, incorporated by reference). This reveals an immense amount of physical information about a scene that would normally be difficult, or sometimes infeasible, to obtain from intensity and color information alone.

On smooth and mildly rough surfaces the phase of the transmitted radiance sinusoid gives surface normal constraint information (L. B. Wolff. Surface orientation from polarization images. In Proceedings of Optics, Illumination and Image Sensing for Machine Vision. II, Volume 850, pages 110–121, Cambridge, Mass., November 1987. SPIE; L. B. Wolff. Polarization Methods in Computer Vision. PhD thesis, Columbia University, January 1991; L. B. Wolff and T. E. Boult. Constraining object features using a polarization reflectance model. IEEE Transactions on Pattern Analysis and Machine Intelligence (PAMI), 13(7):635–657, July 1991, incorporated by reference). Observing FIG. 8, the surface normal is constrained to lie in the specular plane. The pattern of transmitted radiance sinusoid phases from specular reflection occurring at multiple surface orientations on an object gives physical shape cues that can be exploited in object recognition.

Another important mode of physical information for interpreting objects in a scene is identification of intrinsic material classification. The capability of determining whether parts of an object are metal (conductor) or dielectric (nonconductor) can be very useful to object recognition and material inspection in manufacturing (e.g., circuit board inspection, package inspection, etc. . . ). Material classification is a difficult problem using intensity and color, but there exist polarization cues that immensely simplifies the problem of determining relative electrical conductivity of materials, with metal and dielectric at the extremes. The theory of this is explained in L. B. Wolff. Polarization-based material classification from specular reflection. IEEE Transactions on Pattern Analysis and Machine Intelligence (PAMI), 12(11):1059–1071, November 1990 and L. B. Wolff. Polarization Methods in Computer Vision. PhD thesis, Columbia University, January 1991. It turns out that if the specular angle of incidence is between 30° and 80°, and the specular component of reflection is strong relative to the diffuse component, the quantity:

$$I_{max}/I_{min} \tag{3}$$

derived from transmitted radiance sinusoid parameters, is a very reliable discriminator for varying levels of electrical conductivity. Ibis ratio for most metals varies between 1.0 and 2.0 while for dielectrics this ratio is above 3.0.

Obtaining the transmitted radiance sinusoid by rotating a polarizing filter in front of a CCD camera is a mechanically active process that produces optical distortion and is difficult to fully automate. Unless the axis perpendicular to the polarizing filter is exactly aligned with the optic axis of the camera, small shifts in projection onto the image plane occur between different orientations of the polarizing filter. At intensity discontinuities in a scene, significant shifts in image intensity are observed giving the false interpretation of reflected partial polarization even if it does not exist. Fully automating the mechanical rotation of a polarizing filter would require a motor that would have to precisely rotate the filter in synchronization with video frame rates.

FIG. 1 shows the liquid crystal polarization viewer 10 using a CCD camera 14 with a fixed polarizer 12 and two twisted nematic liquid crystals 18, 20 mounted in front. The idea behind a liquid crystal polarization camera is that nothing mechanically rotates; the polarizer 12 remains fixed while the twisted nematic (TN) liquid crystals 18, 20 electro-optically rotate the plane of the linear polarized component of reflected partially linear polarized light. The unpolarized component is not effected. In general, the transmitted radiance sinusoid can be recovered by the relative rotation of the plane of linear polarization with respect to the polarizer 12. Each TN liquid crystal is binary in the sense that it either rotates the plane of linear polarization by fixed n degrees, $0° < n \leqq 90°$, which is determined upon fabrication, and, 0 degrees (i.e., no twist). Two TN liquid crystals are used, one at n=45°, and the other at n=90°, to insure at least 3 samplings of the transmitted radiance sinusoid.

Figure 11:
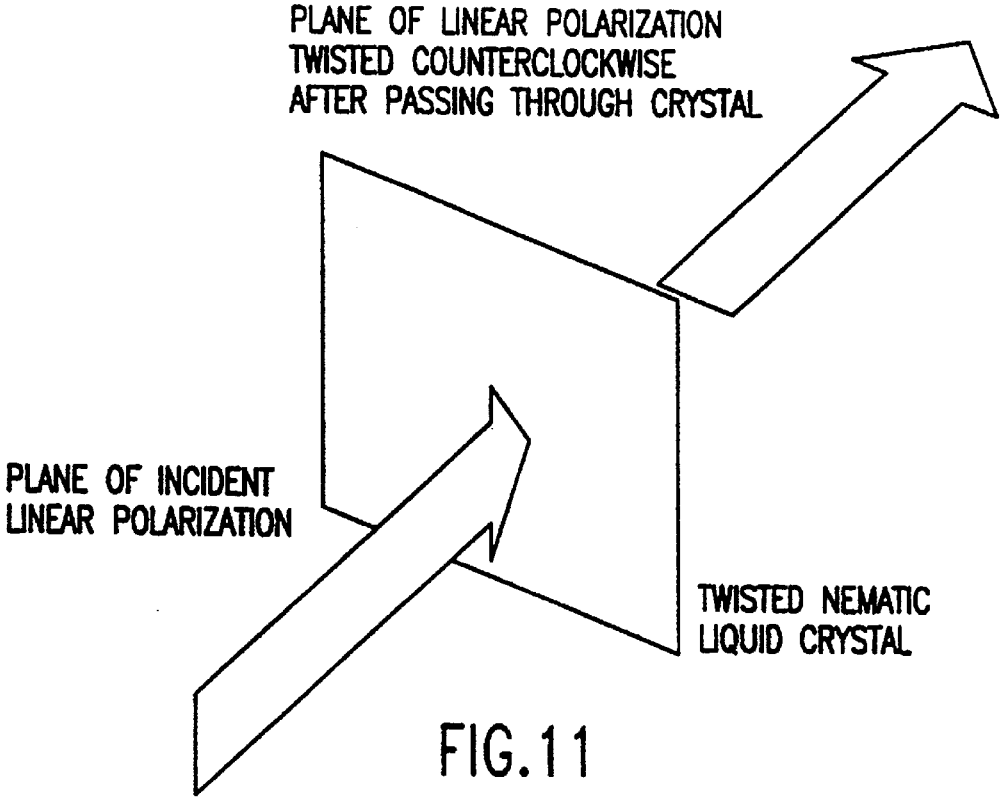
FIG. 11 is a schematic representation of a plane of linear polarized light rotating about a helix of a liquid nematic liquid crystal by N degrees.
Figure 12:
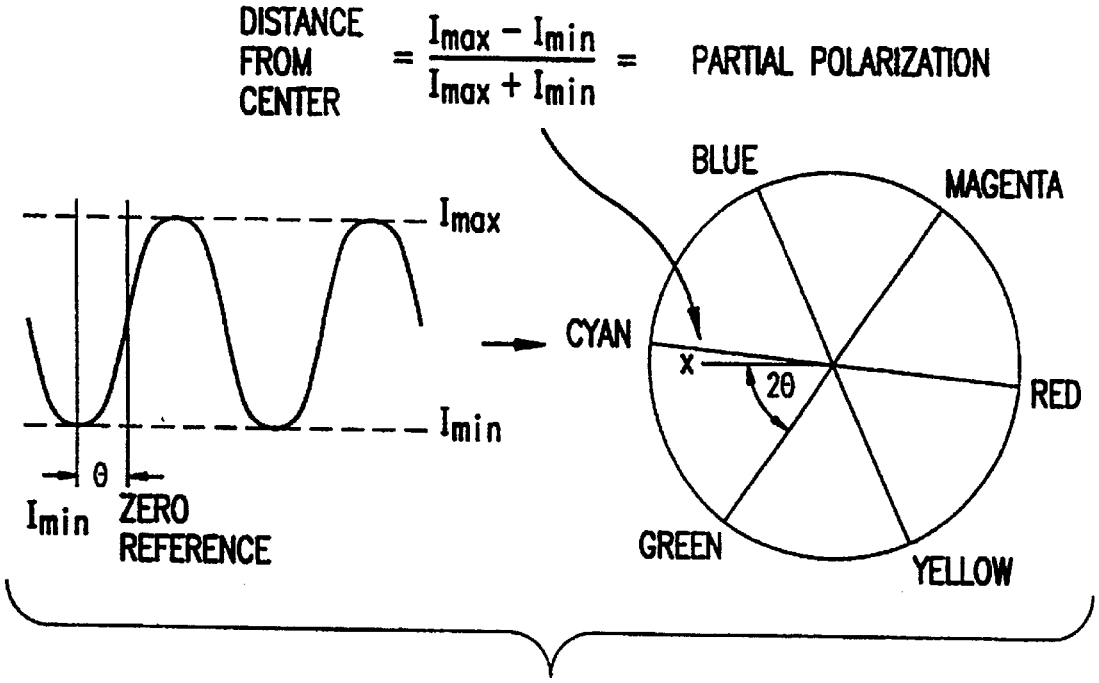
FIG. 12 depicts a mapping of a transmitted radiance sinusoid into HSV color space.

Liquid crystals come in different varieties and some of the theory behind them can be quite involved (E. B. Priestly, P. J. Wojtowicz and P. Sheng. Introduction to Liquid Crystals. Plenum Press, New York, 1975). The molecular structure of the material in twisted nematic liquid crystals is helical, twisting slowly from one face of the crystal to the other face by a predesigned fixed amount n degrees. With no voltage applied across the liquid crystal faces, the plane of linear polarized light rotates along the helix by n degrees. See FIG. 11. When an AC voltage is applied across the liquid crystal faces, the helices straighten out so that the plane of linear polarized light is not rotated in this state. The switching or "relaxation" time of twisted nematic crystals is slow compared to other types, on the order of 1/10 of a second, even though faster switching liquid crystals are being developed as time progresses. Some of the supertwist liquid crystals are now reporting switching times at frame rate of 1/30 second. The switching of liquid crystal states leaves the geometry of the optical projection of the world scene onto the image plane virtually unchanged.

The driver 22 for the polarization camera 10 modulates a high frequency AC voltage so as to produce 4 states between the 2 TN liquid crystals 18, 20, 0°, 45°, 90° and 135°. Each state lasts 4 frame times (1/7.5 seconds) in which the liquid crystals are allowed to switch and an image is grabbed on the last of these frames. Only the first 3 liquid crystal states are utilized, while doing processing on Datacube boards 24 for the last 4 frame times. Grabbing 3 polarization component images together with implementing lookup tables on the Datacube boards 24 that perform the derivations of equation 2, to produce a polarization image takes just ever ½ second.

In order to visualize polarization, a very important component of the polarization view 10 is its output. Instead of just outputting a set of intensity images corresponding to different components of polarization, a polarization camera should produce an image derived from these component images which naturally represents the physical characteristics of polarization. As human vision for the most part is oblivious to the phenomenon of polarization there is a limitation to image representation in terms of intensity and color. The following describes a way in which to map polarization information into a visual color space that not only makes it obvious what physical characteristics of polarization are being represented, but also makes it clear how these characteristics relate to important physical properties of the scene being imaged.

Consider the 3 polarization parameters of equation 2 characterizing the transmitted radiance sinusoid. The quantity $I_{max}+I_{min}$ is directly observed as the total intensity so it is natural to represent this as an image intensity. The other 2 parameters, phase of the transmitted radiance sinusoid, and partial polarization, are not directly observed by human vision, so these are mapped into the color domain. It is quite interesting that the phase of the transmitted radiance sinusoid is an angular quantity with range 0–180 degrees, while the partial polarization is a fractional quantity with range from 0 to 1. This is exactly analogous with hue and saturation, respectively, except that the phase angle of the transmitted radiance sinusoid should be multiplied by 2 to cover the full 360° range of hue. See FIG. 6 for the case when $\theta=0°$ is represented by green. The parameters of equation 2, respectively, are mapped into hue, intensity, and saturation, of HSV color space, as just described, to represent a polarization image. Regions of a polarization image with 0 partial polarization will have no chromatic saturation and will appear as ordinary gray level intensity. Polarization with the same phase will have the same hue but possibly different saturation content according to how much it is partially polarized. The largest phase difference between two transmitted radiance sinusoids is 90° and such polarization states will appear in a polarization image as complementary colors.

Figure 13A:
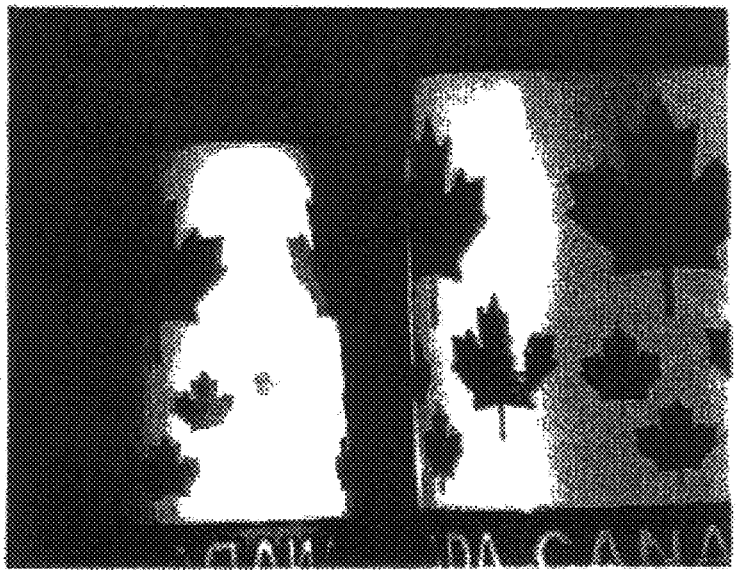
FIG. 13a and 13b are photographs of two mugs in a scene.
Figure 13B:
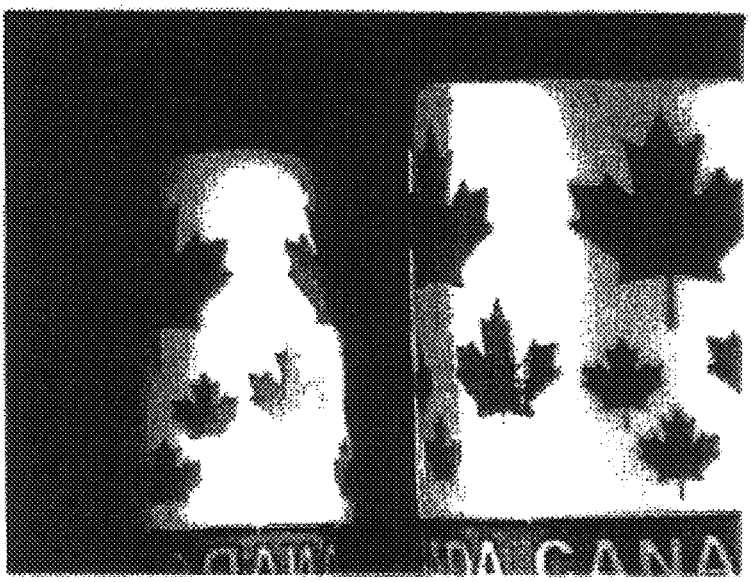

FIG. 13a and 13b shows how a polarization image provides important information about a scene that would be very difficult and perhaps impossible to deduce from an intensity image. The top intensity image of FIG. 13a and 13b shows what apparently are 2 mugs in a scene. Looking closely at the intensity image reveals that there is some difference between the 2 mugs; the left mug has its letters reversed. The only visual cues telling that the left mug is simply a reflection are very high level features such as the reversal of recognizable high level features (e.g., alphabet letters) or the edge of the glass mirror. Otherwise the reflected intensity (and color) of the 2 mugs look essentially the same. This type of problem occurs in vision fairly Frequently such as when stray specular glare from objects give the false interpretation that real edges actually exist there. Consider the problem of an autonomous land vehicle viewing a scene part of which is reflected by a lake or river. How does the vehicle know which are the "real" elements of the scene? How does a mobile robot know when it is running into a glass door, or if navigating according to edge cues, which are geometric edge cues opposed to specular edge cues? The bottom polarization image in FIG. 13a and 13b was obtained with the liquid crystal polarization viewer 10 showing that the left mug has Cyan chromaticity implying significant partial polarization. Cyan chromaticity is also observed at specular highlights on the right mug as well. The very bright center of specularities saturate the camera so that pixels record gray level 255 regardless of the state of the TN liquid crystals. This gives a flat transmitted radiance sinusoid, and hence, the appearance of unpolarized light, when in fact the reflected light from these areas are significantly partially polarized. This is a limitation of the dynamic range of the SONY XC-77 CCD camera 14 being used, and NOT the polarization vision algorithm.) Significant partial polarization is also observed at the occluding contour of the right mug as Red color. Note that the hue colors Cyan and Red are complementary colors indicative of transmitted radiance sinusoids 90° out of phase.

When taking the polarization image in FIG. 13a and 13b, the fixed polarizer analyzer on our liquid crystal polarization camera is oriented so that the transmission axis is horizontal. The hue Cyan represents when the plane of the linear polarized component of reflected light is vertical with respect to the image (i.e., when the transmitted radiance sinusoid is observed minimum when both TN liquid crystals 18, 20 are in the zero twist "ON" state). Using the physical principles discussed in the Background section, Cyan hue corresponds to specular reflection when the specular plane is horizontal relative to the image. As it turns out the specular planes in this image are all approximately horizontal. The Red color hue representing a 90° transmitted radiance sinusoid phase difference relative to the Cyan color hue is indicative of partial polarization from diffuse reflection near an occluding contour. Note the thin edge of specular reflection occurring at the very edge of the occluding contour on the right mug. Even when the specular planes are not known it is possible from polarization images to deduce which are the specular reflections and which are the occluding contours, from a number of physical principles (L. B. Wolff, Polarization Methods in Computer Vision. PhD thesis, Columbia University, January 1991; L. B. Wolff and T. E. Boult. Constraining object features using a polarization reflectance model. IEEE Transactions on Pattern Analysis and Machine Intelligence (PAMI), 13(7):635–657, July 1991). Polarization vision makes segmentation of these types of regions and edges immensely easier than when using intensity.

Figure 14A:
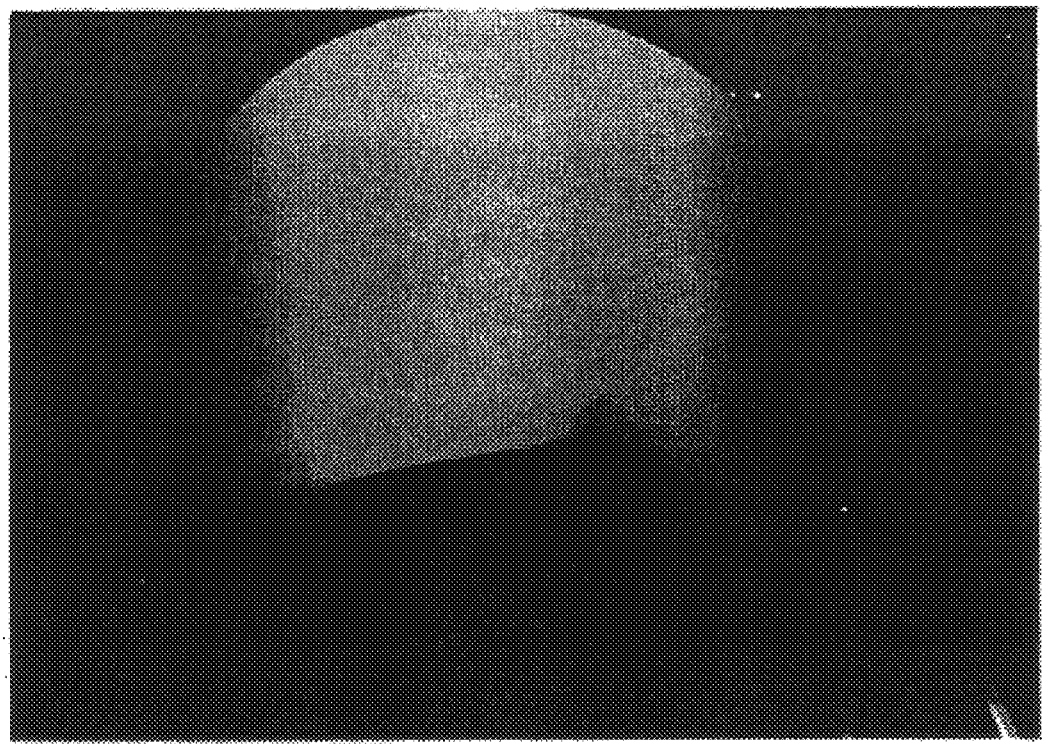
FIG. 14a and 14b are photographs of a cylindrical cup.
Figure 14B:
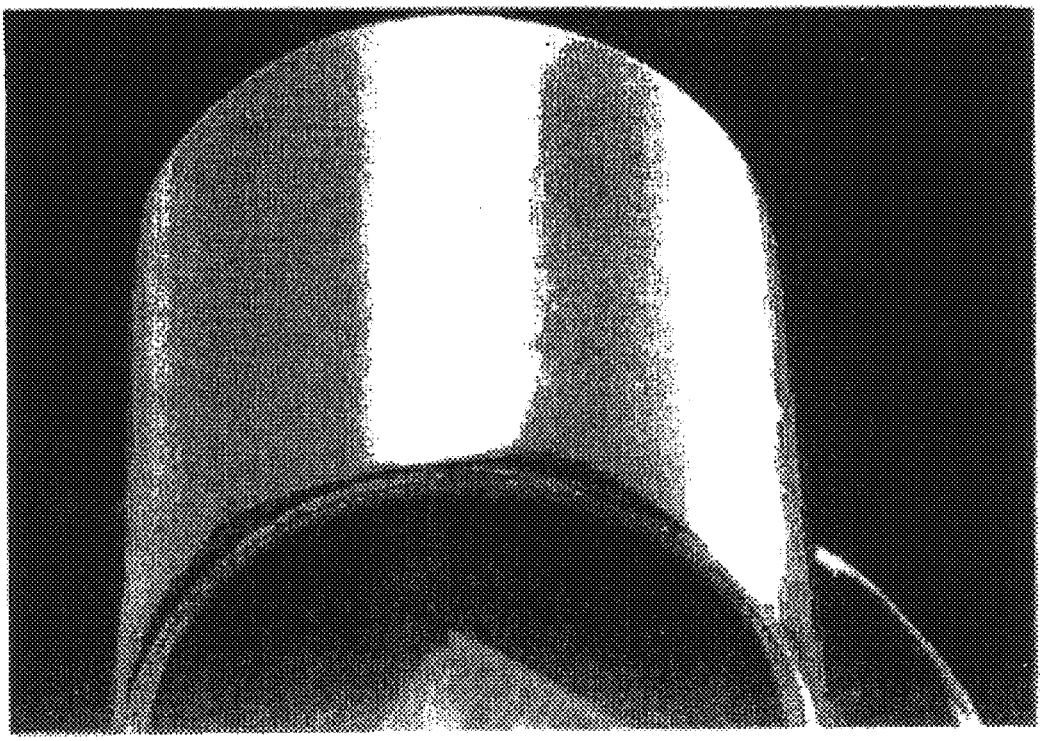
Figure 15A:
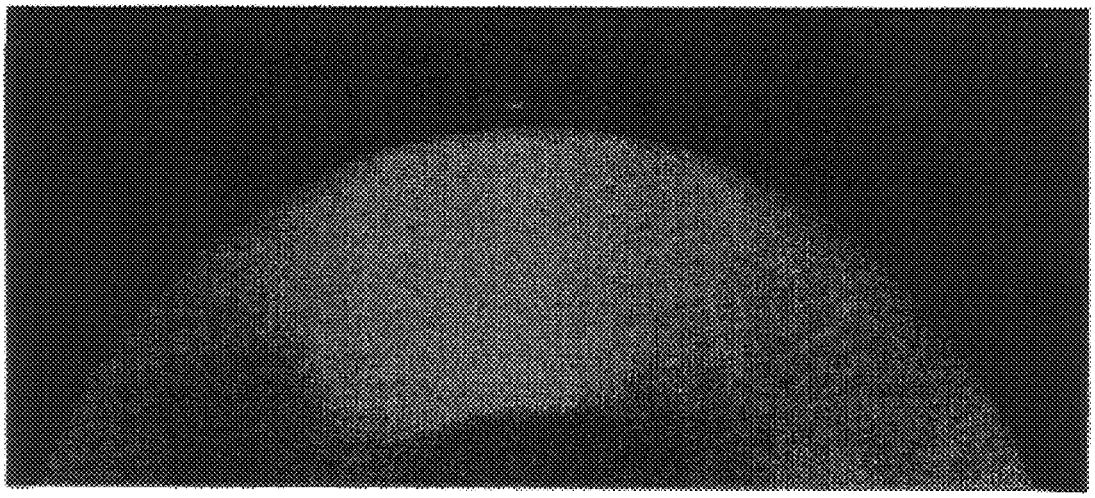
FIG. 15a and 15b are photographs of a plastic sphere.
Figure 15B:
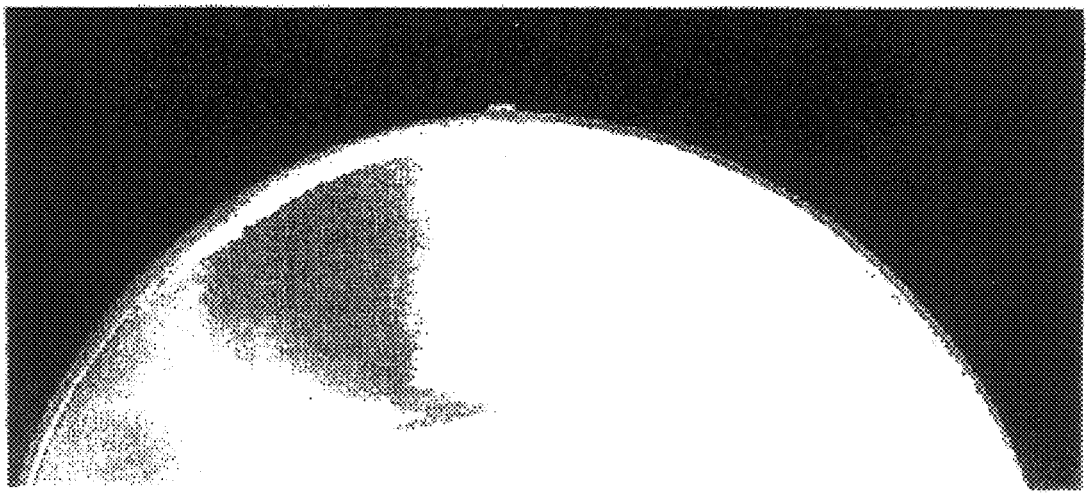

FIG. 14a and 14b shows the intensity and polarization images of a cylindrical cup illuminated with an extended light source so as to produce specular reflection from a number of different surface orientations. The different color hues shown in the polarization image correspond to specular plane surface orientation constraints. See FIG. 8. In this example, Cyan color hue corresponds to specular planes oriented vertically in the image while the complementary color hue, Red, would correspond to specular planes oriented horizontal in the image. Almost the entire spectrum of color hues is displayed here. FIG. 15a and 15b shows intensity and polarization images of one hemisphere of a plastic sphere illuminated with an extended light source. While the polarization image does not give completely unique surface orientation information, the pattern of specular plane constraints gives enough rudimentary shape information to distinguish different shape classes for object recognition. For instance, on a cylindrical shape the lines of constant color hue are parallel to one another (FIG. 14a and 14b) while on a spherical shape lines of constant color hue mutually intersect at a point (FIG. 15a and 15b). Besides being useful in sorting by shape systems in manufacturing, outdoor objects illuminated by skylight serving as an extended illuminator may be able to be distinguished by shape class as well.

Figure 16A:
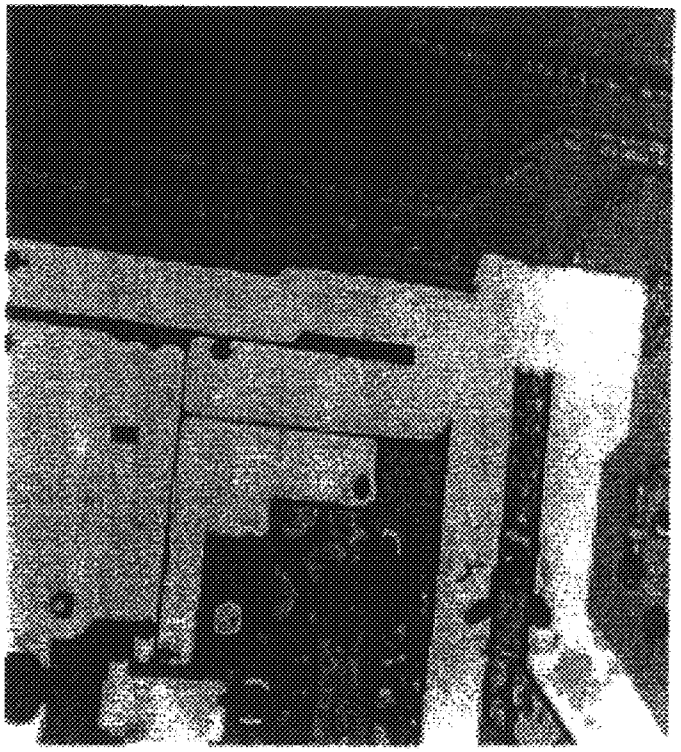
FIG. 16a and 16b are pictures of a circuit board.
Figure 16B:
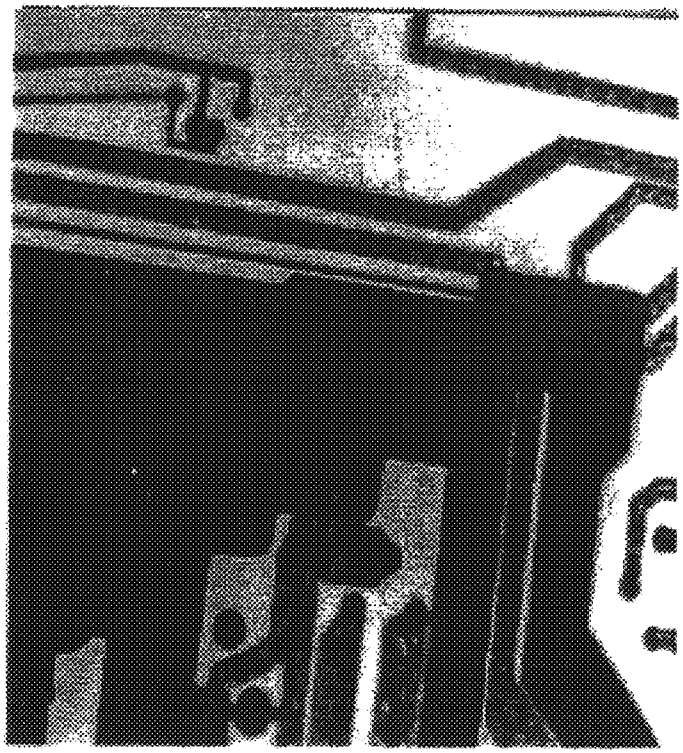

FIG. 16a and 16b shows material classification on a circuit board according to various levels of electrical conductivity. On this circuit board, there are 3 basic classes of materials, bare metal which appears both bright and dark, plastic dielectric which serves as the substrate of the board, and metal on top of which there is a translucent plastic dielectric coating producing a combined reflected polarization signature between that of metal and dielectric. The bottom "polarization image" produced by our polarization camera is not the standard one used previously. Instead each pixel represents the ratio of expression 3 from the Background section. The bright ratios represent dielectric, intermediate ratios represent metal coated with plastic dielectric, dark ratios represent bare metal. In this way, material type is directly visualized instead of polarization state and this exhibits the diversity that is possible with a polarization viewer 10. Any mathematical combination of the transmitted radiance sinusoid parameters can be represented in intensity and color. As these combinations of polarization parameters relate to physical propel-ties of parts of a scene, so can the actual physical properties of the scene be visualized in an output image of a polarization viewer 10.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A polarization viewer comprising:

a first CCD chip which produces a first signal, said first signal corresponding to a measurement of a first polarization component based on electromagnetic radiation the first CCD chip receives;

a first beamsplitter disposed such that radiation reflected by the first beamsplitter is received by the first CCD chip;

a second CCD chip which produces a second signal corresponding to a measurement of a second polarization component based on electromagnetic radiation the second CCD chip receives which is transmitted by the beamsplitter, said second CCD chip disposed such that the second CCD chip receives radiation transmitted by the beamsplitter;

a mechanism for creating polarization information corresponding to a polarization orientation different than that corresponding with the first or second CCD chip; and a mechanism for forming a polarization image based on the first and second signals and the creating mechanism, said forming mechanism in communication with the first and second CCD chips and the generating mechanism.

2. A viewer as described in claim 1 wherein the creating mechanism includes a twist crystal disposed adjacent to the first beamsplitter such that radiation received by the first beamsplitter first passes through the twist crystal.

3. A viewer as described in claim 2 wherein the first beamsplitter is oriented at a 45° angle relative to radiation incident to the first beam splitter.

4. A viewer as described in claim 3 wherein the twist crystal has a first state and a second state, said first state uneffecting the polarization plane of the radiation as radiation passes through the twist crystal, said second state rotating the polarization plane of the radiation as the radiation passes through the twist crystal.

5. A viewer as described in claim 4 including a driver in communication with the crystal which controls the state of the crystal.

6. A viewer as described in claim 5 wherein when the crystal is in the second state, the polarization plane of radiation passes therethrough is rotated 45°.

7. A viewer as described in claim 6 wherein the first CCD chip receives radiation reflected 90° by the first beamsplitter.

8. A polarization viewer comprising:

a first CCD chip which produces a first signal, said first signal corresponding to a measurement of a first polarization component based on electromagnetic radiation the first CCD chip receives;

a first beamsplitter disposed such that radiation reflected by the first beamsplitter is received by the first CCD chip;

a second CCD chip which produces a second signal corresponding to a measurement of a second polarization component based on electromagnetic radiation the second CCD chip receives which is transmitted by the beamsplitter, said second CCD chip disposed such that the second CCD chip receives radiation transmitted by the beamsplitter; and a mechanism for forming a polarization image based on the first and second signals, said forming mechanism in communication with the first and second CCD chips.

9. A viewer as described in claim 8 wherein the first beamsplitter is oriented at a 45° angle relative to radiation incident to the first beam splitter.

10. A polarization viewer comprising:

a first CCD chip which produces a first signal, said first signal corresponding to a measurement of a first polarization component based on electromagnetic radiation receives;

a first beamsplitter disposed such that radiation reflected by the first beamsplitter is received by the first CCD chip;

a second CCD chip which produces a second signal corresponding to a measurement of a second polarization component based on electromagnetic radiation receives which is transmitted by the beamsplitter, said second CCD chip disposed such that receives radiation transmitted by the beamsplitter;

means for creating polarization information corresponding to a polarization orientation different than that corresponding with the first or second CCD chip; and means for forming a polarization image based on the first and second signals and the creating means, said forming means in communication with the first and second CCD chips and the generating means.

11. A polarization viewer comprising:

a first CCD chip which produces a first signal, said first signal corresponding to a measurement of a first polarization component based on electromagnetic radiation receives;

a first beamsplitter disposed such that radiation reflected by the first beamsplitter is received by the first CCD chip;

a second CCD chip which produces a second signal corresponding to a measurement of a second polarization component based on electromagnetic radiation receives which is transmitted by the beamsplitter, said second CCD chip disposed such that receives radiation transmitted by the beamsplitter; and means for forming a polarization image based on the first and second signals, said forming means in communication with the first and second CCD chips.

*12. A polarization viewer, comprising:*

*a filtering mechanism which includes a mechanically fixed array of linear polarizing optical elements for receiving electromagnetic radiation from a scene to be imaged and producing corresponding filtered radiation having polarization components;*

*a sensor responsive to electromagnetic radiation and including a plurality of sensing elements for receiving said filtered radiation, each said polarizing optical element passing radiation of a predetermined polarization orientation to a corresponding sensing element of said sensor, said sensing elements producing output signals corresponding to at least a part of a transmitted radiance sinusoid for each of a set of elements of said scene; and*

*image forming means responsive to said output signals to produce an image corresponding to said elements of said scene.*

*13. The polarization viewer of claim 12, wherein said filtering mechanism includes a beamsplitter direction received radiation to said array.*

*14. The polarization viewer of claim 13, wherein said sensing elements comprise a CCD array.*

*15. The polarization viewer of claim 14, wherein said CCD array comprises first and second CCD chips and wherein said beamsplitter reflects a first portion of said radiation having polarization components to said first CCD chip and transmits a second portion of said radiation having polarization components to said second CCD chip.*

*16. The polarization viewer of claim 15, wherein said first CCD chip produces first output signals corresponding to a measurement of a first polarization component received by said first CCD chip, and said second CCD chip produces second output signals corresponding to a measurement of a second polarization component received by said second CCD chip said first and second output signals corresponding to at least a part of said transmitted radiance sinusoid.*

*17. The polarization viewer of claim 16, further including a steering mechanism which cooperates with said beam splitter to create additional polarization components received by said first CCD chip and second CCD chip.*

*18. The polarization viewer of claim 17, wherein said image forming means is responsive to said first and second output signals to produce a polarization image.*

*19. The polarization of claim 12 wherein said filtering mechanism further includes an array of wavelength sensitive optical elements positioned to pass radiation of only a predetermined wavelength spectrum to a corresponding sensing element of said sensor, said wavelength sensitive optical elements cooperating with said linear polarizing optical elements to pass radiation to each sensing element at a predetermined polarization orientation only over a corresponding wavelength spectrum.*

*20. The polarization viewer of claim 12, wherein said array of linear polarizing optical elements consists of a repetitive sequence of a predetermined polarization orientation pattern, said pattern consisting of a spatial arrangement of linear polarizing optical elements corresponding to sensor elements each individual optical element in said pattern passing radiation of a prescribed polarization orientation to provide a unit pattern, at least part of a transmitted radiance sinusoid being determinable from each said unit pattern in conjunction with corresponding sensor elements.*

*21. The polarization viewer of claim 20 wherein said unit consists of a horizontal or vertical adjacent spatial arrangement of linear polarizing optical elements, each optical element passing radiation of a different prescribed polarization orientation within the unit pattern, such that the repeated sequence of said unit pattern, forms columns or rows, respectively, of optical elements passing radiation with the same polarization orientation.*

*22. The polarization viewer of claim 21 wherein said unit pattern of horizontal or vertical adjacent spatial arrangements of linear polarizing optical elements consists of three optical elements having horizontal 0 degree polarization orientation, diagonal 45 degree polarization orientation, and vertical 90 degree polarization orientation, respectively.*

*23. The polarization viewer of claim 21, wherein said filtering means further includes an array of wavelength sensitive optical elements, each said wavelength sensitive optical element passing radiation of a only predetermined wavelength spectrum to reach each sensing element, such that for a unit pattern of horizontal or vertical adjacent spatial arrangement of polarization orientations said wavelength sensitive optical elements are arranged in a repetitive sequence of respective vertical or horizontal adjacent elements, each said wavelength sensitive element passing a different wavelength spectrum within a sequence, at least part of a transmitted radiance sinusoid being determinable from each said unit pattern in conjunction with corresponding sensor elements, over a corresponding wavelength spectrum.*

*24. The polarization viewer of claim 23, wherein said unit pattern of horizontal or vertical adjacent spatial arrangement of linear polarizing optical elements consists of three optical elements respectively having horizontal 0 degree polarizing orientation diagonal 45 degree polarization orientation, and vertical 90 degree polarization orientation, said wavelength sensitive optical elements being arranged in a repetitive sequence of respective vertical or horizontal adjacent elements, each said wavelength sensitive element passing red, green, or blue within a sequence.*

*25. The polarization viewer of claim 20, wherein said array of optical elements is deposited on or placed adjacent to said plurality of sensing elements.*

*26. The polarization viewer of claim 25, wherein said filtering means further includes means allowing radiation of a predetermined wavelength spectrum to pass to each of said sensing elements corresponding to said different spatial patterns of polarization orientation, with a different wavelength corresponding to each of said different spatial patterns.*

*27. The polarization viewer of claim 20, wherein said filtering mechanism further includes an array consisting of a repetitive sequence of a predetermined wavelength spectrum pattern, said spectrum pattern consisting of a spatial arrangement of wavelength sensitive optical elements each wavelength sensitive optical element being optically aligned with a unit pattern of said linear polarizing optical elements, whereby at least part of a transmitted radiation sinusoid can be determined at the same prescribed wavelength spectrum in conjunction with corresponding sensor elements.*

*28. The polarization viewer of claim 27, wherein said optical elements are deposited on or placed adjacent to corresponding sensing elements.*

*29. The polarization viewer of claim 20, wherein said filtering mechanism further includes a plurality of wavelength sensitive optical elements each corresponding to one of said unit pattern of linear polarizing optical elements, whereby the transmitted radiance sinusoid determinable from a unit pattern is determined at a prescribed wavelength spectrum.*

*30. The apparatus of claim 12, wherein said filtering mechanism includes a beamsplitter for directing said filtered radiation along first and second paths, and wherein said sensing elements include first and second arrays of pixels for receiving radiation from said first and second paths, respectively.*

*31. The apparatus of claim 12, wherein said filtering mechanism includes a controllable steering mechanism for varying the plane of polarization of said electromagnetic radiation, radiation from said steering mechanism being directed through said linear polarizer to said sensor.*

*32. The apparatus of claim 12, wherein said filtering mechanism includes an array of linear polarizing optical elements incorporating a repetitive sequence of elements having predetermined spatial patterns of polarization orientations.*

*33. A polarization viewer, comprising:*

*a mechanically fixed linear polarizing element for receiving electromagnetic radiation from a scene and producing corresponding radiation having polarization components;*

*a steering mechanism for varying the orientation of polarization components of said electromagnetic radiation from a scene, said steering mechanism being so located that said radiation from a scene passes through said steering mechanism before passing through said linear polarizing element;*

*a sensor responsive to said corresponding radiation to produce output signals corresponding to at least part of a transmitted radiance sinusoid for each of a set of elements of said scene;*

*image forming means responsive to said output signals to produce an image corresponding to said elements of said scene; and*

*means to control said steering mechanism to vary said orientation of said polarization components, said steering mechanism in conjunction with said linear polarizing element producing the corresponding radiation received by said sensor.*

*34. Polarization viewer of claim 33, wherein said means to control said steering mechanism is in communication with said sensor to synchronize the control means with the sensor.*

*35. The polarization viewer of claim 33, wherein said steering mechanism includes at least one twisted nematic liquid crystal with a twist angle of m1, said-crystal being electrically switchable by said control means to produce a steering angle of 0 degrees or m1, degrees.*

*36. The viewer of claim 35, wherein said steering mechanism includes a plurality of twisted nematic liquid crystals having twist angles and arranged in series along the optical path for the electromagnetic radiation, each said crystal being switchable by said control means to produce selected steering angles.*

*37. The polarization viewer of claim 35, wherein said steering mechanism includes a first crystal having a twist angle of 45 degrees and a second crystal having a twist angle of 90 degrees, said crystals being selectively switchable by said control means to produce steering angles of 0 degrees, 45 degrees 90 degrees and 135 degrees for radiation reaching said linear polarizer.*

*38. The polarization viewer of claim 37, wherein said image forming means produces a visual representation of image polarization.*

*39. The polarization viewer of claim 38, wherein said sensor includes a plurality of pixels each responsive to received electromagnetic radiation to produce said output signals.*

*40. The polarization viewer of claim 12 or 33, connected to a pair of wearable goggles over the eyes of a user such that said image forming means produces a visual representation of image polarization within the view of the user.*

*41. The polarization viewer of claim 12 or 33, connected to a pair of wearable goggles over the eyes of a user such that said image forming means produces individual polarization components within the view of the user.*

* * * * *